US012185053B2

(12) United States Patent
Wang et al.

(10) Patent No.: US 12,185,053 B2
(45) Date of Patent: Dec. 31, 2024

(54) ACOUSTIC DEVICE

(71) Applicant: SHENZHEN SHOKZ CO., LTD., Guangdong (CN)

(72) Inventors: Yueqiang Wang, Shenzhen (CN); Zhongqi Wu, Shenzhen (CN); Fen You, Shenzhen (CN); Chaowu Li, Shenzhen (CN); Qingyu Zeng, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 227 days.

(21) Appl. No.: 17/806,504

(22) Filed: Jun. 13, 2022

(65) Prior Publication Data

US 2022/0312098 A1 Sep. 29, 2022

Related U.S. Application Data

(63) Continuation of application No. PCT/CN2021/090822, filed on Apr. 29, 2021.

(30) Foreign Application Priority Data

Apr. 30, 2020 (CN) ......................... 202020720292.7
Aug. 12, 2020 (CN) ......................... 202021679790.8

(51) Int. Cl.
*H04R 1/10* (2006.01)

(52) U.S. Cl.
CPC ........... *H04R 1/105* (2013.01); *H04R 1/1016* (2013.01); *H04R 2460/13* (2013.01)

(58) Field of Classification Search
CPC .. H04R 1/105; H04R 1/1016; H04R 2460/13; H04R 1/1058; H04R 1/083; H04R 1/1041; H04R 1/1066; H04R 5/0335; H04R 25/00; H04R 2201/107; H04R 2410/07
See application file for complete search history.

(56) References Cited

U.S. PATENT DOCUMENTS

| | | | | |
|---|---|---|---|---|
| 11,664,692 B2* | 5/2023 | Huang | .................. | H02K 21/12 310/156.01 |
| 2009/0060231 A1* | 3/2009 | Buroojy | ................. | H04R 5/033 381/381 |
| 2021/0067879 A1* | 3/2021 | Li | ........................ | H04R 1/1041 |

FOREIGN PATENT DOCUMENTS

| | | |
|---|---|---|
| CN | 107454492 A | 12/2017 |
| CN | 209267805 U * | 8/2019 |
| CN | 110493679 A | 11/2019 |

(Continued)

OTHER PUBLICATIONS

International Search Report in PCT/CN2021/090822 mailed on Jul. 12, 2021, 6 pages.

*Primary Examiner* — Akelaw Teshale
(74) *Attorney, Agent, or Firm* — METIS IP LLC

(57) ABSTRACT

The present disclosure discloses an acoustic device. The acoustic device may include a hanger assembly, at least one of an audio input component or an audio output component, a control circuit assembly, and a protection assembly. The hanger assembly may include a shell forming a space. The control circuit assembly may include one or more circuit boards arranged in the space. The protection assembly may include a protection plate. The protection plate may be arranged in the space and physically connected with the shell of the hanger assembly to form a protection barrier between at least one of the one or more circuit boards and the shell.

20 Claims, 21 Drawing Sheets

(56) References Cited

FOREIGN PATENT DOCUMENTS

| | | |
|---|---|---|
| CN | 210112221 U | 2/2020 |
| CN | 211702355 U | 10/2020 |

* cited by examiner

ACOUSTIC DEVICE

CROSS-REFERENCE TO RELATED APPLICATIONS

This application is a continuation of International Patent Application No. PCT/CN2021/090822, filed on Apr. 29, 2021, which claims priority to Chinese Patent Application No. 202020720292.7, filed on Apr. 30, 2020, and Chinese Patent Application No. 202021679790.8, filed on Aug. 12, 2020, the contents of each of which are incorporated herein by reference in their entirety.

TECHNICAL FIELD

The present disclosure relates to the field of bone conduction devices, in particular, to a bone conduction acoustic device.

BACKGROUND

Bone conduction is a way of sound conduction, that is, sound is transformed into mechanical vibrations with different frequencies. The sound is transmitted through bones and tissues (such as the skull, the bony labyrinth, inner ear lymph, the spiral organ, the auditory nerve, and the auditory center). Bone conduction acoustic devices (such as bone conduction earphones) are close to the bones. Using bone conduction technology to receive words, sound waves can be transmitted directly to the auditory nerve through the bones. Thus, ears can be free without damaging the tympanic membrane. Therefore, the bone conduction acoustic devices are loved by the majority of consumers. The structure assemblies of the existing bone conduction acoustic devices are imperfect, and lack of waterproof function. And layout of the existing bone conduction acoustic devices is unreasonable, which occupies a large space. Therefore, it is desired to provide a bone conduction acoustic device with more perfect structure assemblies and structure layout to meet the needs of users.

SUMMARY

One aspect of the present disclosure may provide an acoustic device. The acoustic device may include a hanger assembly, at least one of an audio input component or an audio output component, a control circuit assembly, and a protection assembly. The hanger assembly may include a shell forming a space. The control circuit assembly may include one or more circuit boards arranged in the space. The protection assembly may include a protection plate. The protection plate may be arranged in the space and physically connected with the shell of the hanger assembly to form a protection barrier between at least one of the one or more circuit boards and the shell.

In some embodiments, the control circuit assembly may include an interaction component configured to facilitate interaction between a user and the control circuit assembly. The interaction component may include a first component arranged on the shell and a second component arranged on at least one of the one or more circuit boards. The first component may be configured to receive an instruction of the user. The second component may be configured to trigger the control circuit assembly to implement a function corresponding to the instruction in response to the instruction received by the first component.

In some embodiments, the first component may include one or more keys. The second component may include one or more switches. The shell may be provided with a first hole, the protection plate may be provided with a second hole. The one or more keys are movably arranged in the first hole and the second hole to toggle the one or more switches and trigger the control circuit assembly to implement a corresponding function.

In some embodiments, at least one of the one or more keys may include a movable part and a connecting part. At least a portion of the movable part may be located in the first hole, and the connecting part may pass through the second hole to contact and toggle at least one of the one or more switches.

In some embodiments, a surface of the protection plate facing the movable part may be provided with protrusions around an edge of the second hole, and the protrusions may butt a surface of the movable part.

In some embodiments, the connecting part may include two connecting plates. An end of each of the two connecting plates may be connected with the movable part, and another end of each of the two connecting plates may be provided with a connector to connect the protection plate.

In some embodiments, the another end of one of the two connecting plates may be provided with an accommodation area configured to accommodate the one or more switches to make the one or more keys toggle the one or more switches.

In some embodiments, the audio output component may include a speaker component configured to convert an audio signal into a mechanical vibration. The hanger assembly may include a connecting component. One end of the connecting component may be connected with the shell, and another end of the connecting component may be connected with the speaker component.

In some embodiments, the shell may include a first shell and a second shell. The first shell may be physically connected with the connecting component, and the first shell and the second shell may be connected to form the space.

In some embodiments, the space may have a length direction and a thickness direction perpendicular to the length direction. The first shell may be spliced to the second shell along a splicing direction perpendicular to the length direction and the thickness direction.

In some embodiments, a first clamping groove and a second clamping groove may be arranged on the first shell with an interval along the length direction. A first clamping block and a second clamping block may be arranged on the second shell along the thickness direction. The first clamping block may be embedded in the first clamping groove, and the second clamping block may be embedded in the second clamping groove to clamp the first shell and the second shell.

In some embodiments, a portion of the second shell may be provided with a power socket. The power socket may be connected with the space, and the power socket is configured to accommodate a power interface. The second clamping block may be closer to the space relative to the power socket.

In some embodiments, a projection of the second clamping block and a projection of the power socket on a first reference plane perpendicular to the length direction may overlap. The projection of the second clamping block and the projection of the power socket on a second reference plane perpendicular to the splicing direction may overlap.

In some embodiments, a direction of an opening of the first clamping groove and a direction of an opening of the second clamping groove may be the same, and the openings of the first clamping groove and the second clamping groove may be respectively located at ends of the first shell along the length direction. The direction of the opening of the first clamping groove may face the space, and the direction of the opening of the second clamping groove may deviate from the space.

In some embodiments, a direction of an extension of the first clamping block and a direction of an extension of the second clamping block may be the same, and the extensions of the first clamping block and the second clamping block may be respectively located at ends of the second shell along the length direction. The extension direction of the first clamping block may deviate from the space, and the extension direction of the second clamping block may face the space.

In some embodiments, an edge part of the first shell may form a first limiting component. The second shell may be provided with a second limiting component. The first limiting component and the second limiting component may be configured to limit a relative movement of the first shell and the second shell in the length direction.

In some embodiments, the audio input component may include a sound pickup component configured to obtain external sounds. The sound pickup component may be arranged in the space. The shell may be provided with a third hole, and the sound pickup component may obtain the external sounds through the third hole.

In some embodiments, the protection assembly may further include a protection net. The protection net may be arranged on a sound path of the sound pickup component.

In some embodiments, the audio input component may further include an elastic connecting rod. An end of the elastic connecting rod may be connected with the speaker component, another end of the elastic connecting rod may be connected with the sound pickup component.

In some embodiments, the elastic connecting rod may be provided to make that an average amplitude attenuation rate is not less than 35% when a vibration of a voice frequency band generated by the speaker component is transmitted from the one end of the elastic connecting rod to the another end of the elastic connecting rod.

Another aspect of the present disclosure may provide a bone conduction earphone. The bone conduction earphone may include an audio output component and a hanger assembly. The audio output component may be configured to convert an audio signal into a mechanical vibration. The hanger assembly may include a first shell, a connecting component, and a second shell. An end of the connecting component may be connected with the first shell, another end of the connecting component may be connected with the audio output component. The first shell and the second shell may be connected to form a space. The space may have a length direction and a thickness direction perpendicular to the length direction. A first clamping groove and a second clamping groove may be arranged on the first shell with an interval along the length direction. A first clamping block and a second clamping block may be arranged on the second shell along the thickness direction. The first clamping block may be embedded in the first clamping groove, and the second clamping block may be embedded in the second clamping groove to clamp the first shell and the second shell.

Another aspect of the present disclosure may provide a waterproof key component. The waterproof key component may include a shell, one or more keys, and a protection plate. The shell may include a space and a first hole connecting with the space. The protection plate may be arranged in the space and physically connected with the shell. The protection plate may be provided with a second hole. The one or more keys may be movably arranged in the first hole and the second hole to toggle a switch.

Additional features of the present disclosure may be described in the following description. Through the study of the following description and corresponding drawings or the understanding of the production or operation of the embodiment, some additional features of the present disclosure are obvious to those skilled in the art. The features of the present disclosure can be realized and obtained by practice or using various aspects of the methods, tools and combinations described in the following embodiments.

BRIEF DESCRIPTION OF THE DRAWINGS

The present disclosure is further illustrated in terms of exemplary embodiments, and these exemplary embodiments are described in detail with reference to the drawings. These embodiments are not restrictive. In these embodiments, the same number indicates the same structure, wherein.

DETAILED DESCRIPTION

Figure 1A:
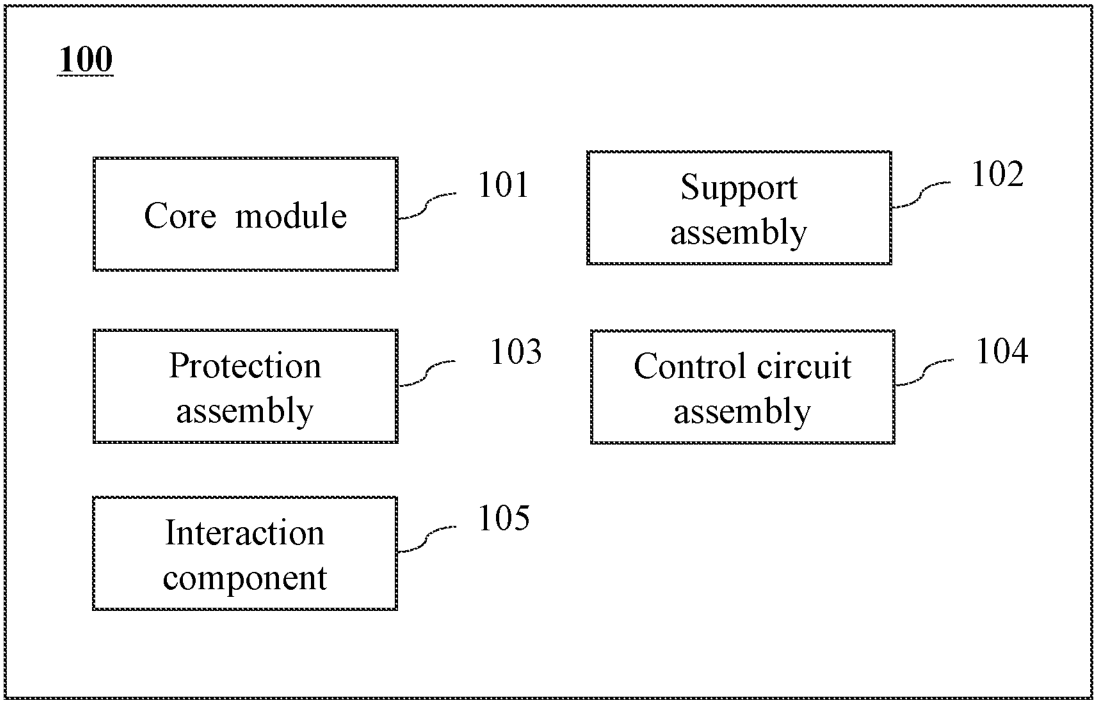
FIG. 1A is a block diagram illustrating an exemplary acoustic device according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" used herein are one method to distinguish different components, elements, parts, sections, or assemblies of different levels in ascending order. However, the terms may be displaced by other expressions if they may achieve the same purpose As shown in the present disclosure and claims, unless the context clearly indicates exceptions, the words "a," "an," "one," and/or "the" do not specifically refer to the singular, but may also include the plural. The terms "including" and "comprising" only suggest that the steps and elements that have been clearly identified are included, and these steps and elements do not constitute an exclusive list, and the method or device may also include other steps or elements.

The present disclosure provides an acoustic device. The acoustic device may include a hanger assembly, at least one of an audio input component or an audio output component, a control circuit assembly, and a protection assembly. The hanger assembly may include a shell forming a space. The control circuit assembly may include one or more circuit boards arranged in the space. The protection assembly may include a protection plate. The protection plate may be arranged in the space and physically connected with the shell of the hanger assembly to form a protection barrier between at least one of the one or more circuit boards and the shell.

FIG. 1A is a block diagram illustrating an exemplary acoustic device according to some embodiments of the present disclosure. In some embodiments, an acoustic device 100 may input and/or output sound. For example, the acoustic device 100 may have functions of, for example, a speaker, a microphone, a hearing aid, etc. In some embodiments, the acoustic device 100 may be configured to acquire sound to generate an audio signal (i.e., a mechanical vibration signal) and convert the audio signal into an electrical signal. In some embodiments, the acoustic device 100 may be configured to convert an electrical signal into an audio signal (i.e., a mechanical vibration signal). In some embodiments, the acoustic device 100 may be configured to convert an audio signal (i.e., a mechanical vibration signal) into an electrical signal, and may be configured to convert an electrical signal into an audio signal (i.e., a mechanical vibration signal). In some embodiments, the acoustic device 100 may include a bone conduction earphone, a bone conduction microphone, a bone conduction speaker, a bone conduction sound transmission device, an air conduction earphone, an air conduction microphone, an air conduction speaker, or an air conduction sound transmission device. As shown in FIG. 1A, the acoustic device 100 may include a core module 101, a support assembly 102, a protection assembly 103, a control circuit assembly 104 and an interaction component 105.

In some embodiments, the core module 101 may be configured to implement functions of the acoustic device 100. The core module 101 may include at least one of an audio output component or an audio input component. In some embodiments, the audio output component may input sound to a user. Merely by way of example, the audio output component may include a speaker component. In some embodiments, the audio input component may be configured to acquire external sound. Merely by way of example, the audio input component may include a sound pickup component. The sound pickup component may be configured to acquire user's voice, the environment sound of the user's environment, or the like. For example, the sound pickup component may include a bone conduction microphone, an air conduction microphone, etc., or a combination thereof. For example, the audio input component may convert the acquired sound (i.e., a mechanical vibration) into an electrical signal including sound content, and transmit the electrical signal to the audio output component. The audio output component may convert the received electrical signal into a mechanical vibration, and transmit the mechanical vibration to the user's auditory nervous system based on bone conduction, so that the user may hear the sound, thus the function of hearing aid of the acoustic device 100 may be implemented. In some embodiments, the core module 101 may be arranged in the support assembly 102 and electrically connected with other assemblies of the acoustic device 100 (e.g., the control circuit assembly 104).

In some embodiments, there may be one or more core modules 101. In some embodiments, there may be one single core module 101, and the core module 101 may be arranged at either end of the support assembly 102. In some embodiments, there may be a plurality of the core modules 101, and the plurality of core modules 101 may be respectively arranged at both ends of the support assembly 102. More information about the core module 101 may refer to the description of other parts.

In some embodiments, the support assembly 102 may be configured to support other assemblies of the acoustic device 100, such as the core module 101, the protection assembly 103, the control circuit assembly 104, and the interaction component 105. In some embodiments, the support assembly 102 may include a hanger assembly. In some embodiments, the hanger assembly may be configured to hang the acoustic device 100 on the user's body. For example, the hanger assembly may be configured to hang the acoustic device 100 on a user's ear. In some embodiments, the hanger assembly may be configured to provide a space for other assemblies of the acoustic device 100 to support the other assemblies. For example, the core module 101 and the control circuit assembly 104 may be accommodated in the space inside the hanger assembly. In some embodiments, the support assembly 102 may include a rear hanger assembly.

The rear hanger assembly may be connected with the hanger assembly and enable the acoustic device 100 to be stably worn. In some embodiments, the support assembly 102 may be physically connected with other assemblies of the acoustic device 100, such as the core module 101, the protection assembly 103, the control circuit assembly 104, and the interaction component 105. Merely by way of example, the physical connection may include injection molding connection, welding, riveting, bolt, bonding, clamping, etc., or any combination thereof.

In some embodiments, the support assembly 102 may include a shell, which may be provided with one or more holes (e.g., a sound pickup hole, a hole for a key, etc.). In some embodiments, at least one of the one or more holes may be opened on the rear hanger assembly. In some embodiments, at least one of the one or more holes may be opened on the hanger assembly. In some embodiments, the one or more holes may be configured to accommodate elements in the interaction component 105. In some embodiments, the one or more holes may be used for the core module 101 acquiring sound (also referred to as the sound pickup hole). For example, the audio input component may acquire external sound through the sound pickup hole. Further, the audio signal may be transmitted to the audio input component through the sound pickup hole. More information about the one or more holes may refer to the description of other parts, such as the detailed description of FIGS. 4, 5, 7, 8, and 10.

In some embodiments, the protection assembly 103 may have a function of protecting the acoustic device 100, such as waterproof function and dustproof function. In some embodiments, the protection assembly 103 may include a protection plate. The protection plate may be arranged in the support assembly 102 and physically connected with the support assembly to form a protection barrier for protecting the acoustic device 100. For example, the core module 101 may be arranged in the space inside the support assembly, and the protection plate may be arranged between the core module 101 and a shell of the support assembly 102 to form a protection barrier to protect the core module 101, to achieve the waterproof function and dustproof function. In some embodiments, the protection assembly 103 may also include a protection net (also referred to as a windproof net). The protection net may be arranged on a sound path of the sound pickup component to improve the windproof capacity and noise prevention capacity of the sound pickup component, and improve the waterproof and dustproof performance of the acoustic device 100.

In some embodiments, the control circuit assembly 104 may be configured to control other assemblies of the acoustic device 100 (e.g., the core module 101) to implement the functions of the acoustic device 100. The control circuit assembly 104 may be arranged in the space provided by the hanger assembly and electrically connected with other assemblies of the acoustic device 100 (e.g., the core module 101). Merely by way of example, the control circuit assembly 104 may include one or more circuit boards arranged in the space provided by the hanger assembly. The one or more circuit boards may be electrically connected with other assemblies controlling the acoustic device 100 (e.g., the core module 101) to control operations of the acoustic device 100 and implement corresponding operations, such as volume control, switch on/switch off, earphone mode selection, wireless connection or data transmission.

In some embodiments, the one or more circuit boards may include a main circuit board (also known as a main control circuit board). The main circuit board may be configured to control the core module 101 to convert an electrical signal into a mechanical vibration. In some embodiments, the main circuit board may be arranged in the space provided by the hanger assembly of the support assembly 102. In some embodiments, the main circuit board and the core module 101 may be arranged at the same end of the support assembly 102 or at two ends of the support assembly 102, respectively. In some embodiments, the main circuit board may be connected with the core module 101 through wires. More information about the main circuit board may refer to the description of other parts, such as the detailed description of FIGS. 6-8.

In some embodiments, the interaction component 105 may be configured to facilitate interaction between a user and the acoustic device 100 (e.g., the core module 101). For example, the interaction component 105 may be configured to facilitate the interaction between the user and the control circuit assembly. Further, the interaction component 105 may trigger the control circuit assembly to control the acoustic device 100 to implement the function corresponding to an instruction of the user in response to receiving the instruction of the user. For example, the interaction component 105 may control the control circuit assembly to implement a switch on/off function of the acoustic device 100 in response to receiving a pressing instruction of the user.

In some embodiments, the interaction component 105 may include a first component arranged on the support assembly 102 (e.g., hanger assembly) and a second component arranged on the core module 101 (e.g., control circuit assembly). For example, the interaction component 105 may include a first component arranged on the shell of the hanger assembly, and the second component arranged on one of the one or more circuit boards (e.g., the main circuit board) on the control circuit assembly. The first component may be configured to receive an instruction of the user. The instruction of the user may be in a form of force, sound, or the like. For example, the user may generate an instruction of the user by pressing, touching, or the like. In some embodiments, the first component may include one or more keys, such as a volume key and a function key. The second component may trigger the core module 101 (e.g., the control circuit assembly) to implement the function corresponding to the instruction of the user, such as play/pause, switch on/off, etc., in response to the instruction of the user (e.g., pressing, touching) received by the first component. In some embodiments, the second component may include one or more switches, such as a mechanical switch, a voice switch, or the like. Merely by way of example, the first component (e.g., the one or more keys) may pull the second component (e.g., the mechanical switch) to trigger the control circuit assembly to implement the function corresponding to the second component. As another example, the second component may trigger the control circuit assembly to implement the function corresponding to the second component in response to a certain intensity of sound.

In some embodiments, the acoustic device 100 may further include a battery assembly (not shown). The battery assembly may be configured to power other assemblies controlling the acoustic device 100 (e.g., the core module 101). Merely by way of example, the battery assembly may be arranged in the space provided by the hanger assembly. In some embodiments, the battery assembly and the core module 101 may be arranged at the same end of the support assembly 102 or at two ends of the support assembly 102, respectively. In some embodiments, the battery assembly may be connected with the core module 101 through a wire.

It should be noted that above description about the acoustic device 100 is merely provided for convenience of description, and is not intended to limit the scope of the present disclosure. For those skilled in the art, various modifications and changes may be made to the acoustic device 100 under the guidance of the present disclosure. However, these modifications and changes are still within the scope of the present disclosure.

Figure 1B:
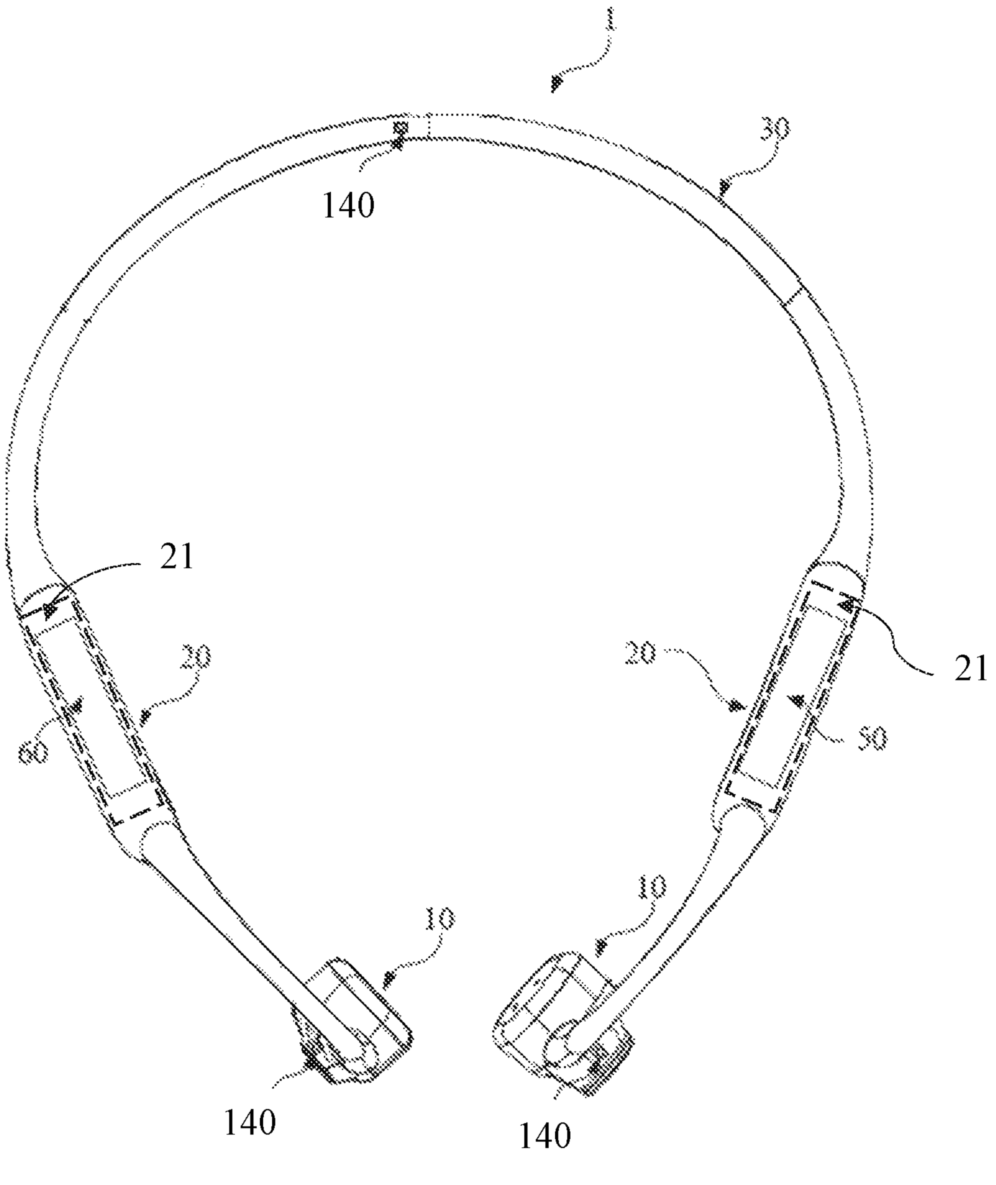
FIG. 1B is a structure diagram illustrating an exemplary acoustic device according to some embodiments of the present disclosure.

FIG. 1B is a structure diagram illustrating an exemplary acoustic device according to some embodiments of the present disclosure. As shown in FIG. 1B, an acoustic device 1 may include two speaker components 10, two hanger assemblies 20, a rear hanger assembly 30 between the two hanger assemblies 20, a battery assembly 50, and a control circuit assembly 60.

In some embodiments, the speaker component 10 may be configured to convert an audio signal (e.g., an electrical signal) into a mechanical vibration. When the acoustic device 1 is worn by a user, the speaker component 10 may transmit the mechanical vibration to an auditory system (e.g., the auditory nerve) of the user through bone of the user, so that the user may hear sound. For example, the speaker component 10 may be close to the head of the user adjacent to the ear, and the mechanical vibration may be transmitted to the auditory system of the user through the bone of the user's head.

In some embodiments, two speaker components 10 may be connected with a hanger assembly 20, respectively. When wearing the acoustic device 1, the hanger assembly 20 may be hung on the user's ears. The hanger assembly 20 may be connected with the rear hanger assembly 30 and the speaker component 10 respectively, and arranged between the rear hanger assembly 30 and the speaker component 10. The hanger assemblies 20 may form space 21. In some embodiments, the space 21 of one of the two hanger assemblies 20 may be configured to accommodate the battery assembly 50, and the space 21 of another hanger assemblies 20 may be configured to accommodate the control circuit assembly 60.

In some embodiments, the rear hanger assembly 30 may be wrapped around the back of the user's head or neck when the acoustic device 1 is worn. The rear hanger assembly 30 may be connected with two hanger assemblies 20, and may have a stable structure so that the acoustic device 1 may be stably worn. In some embodiments, the battery assembly 50 and/or the control circuit assembly 60 may be arranged in the rear hanger assembly 30.

In some embodiments, the acoustic device 1 may also include one or more sound pickup components 140. The one or more sound pickup components 140 may be arranged in the hanger assembly 20, the rear hanger assembly 30, and/or the speaker component 10. For example, a plurality of sound pickup components 140 may be arranged on the rear hanger assembly 30 with intervals. As another example, one of the plurality of sound pickup components 140 may be arranged at a middle position of the rear hanger assembly 30, and other sound pickup components 140 may be arranged on one or both sides of the middle position of the rear hanger assembly 30 with intervals. As another example, some of the plurality of sound pickup components 140 may be arranged in the hanger assembly 20 with intervals, and other sound pickup components may be arranged in the rear hanger assembly 30 with intervals. The plurality of sound pickup components 140 may be independent, and one of the plurality of sound pickup components 140 may independently pick up sounds and amplify signals, thus the sound in different directions may be picked up and processed, so that the user may receive the sound in different directions and improve the auditory effect.

Figure 2:
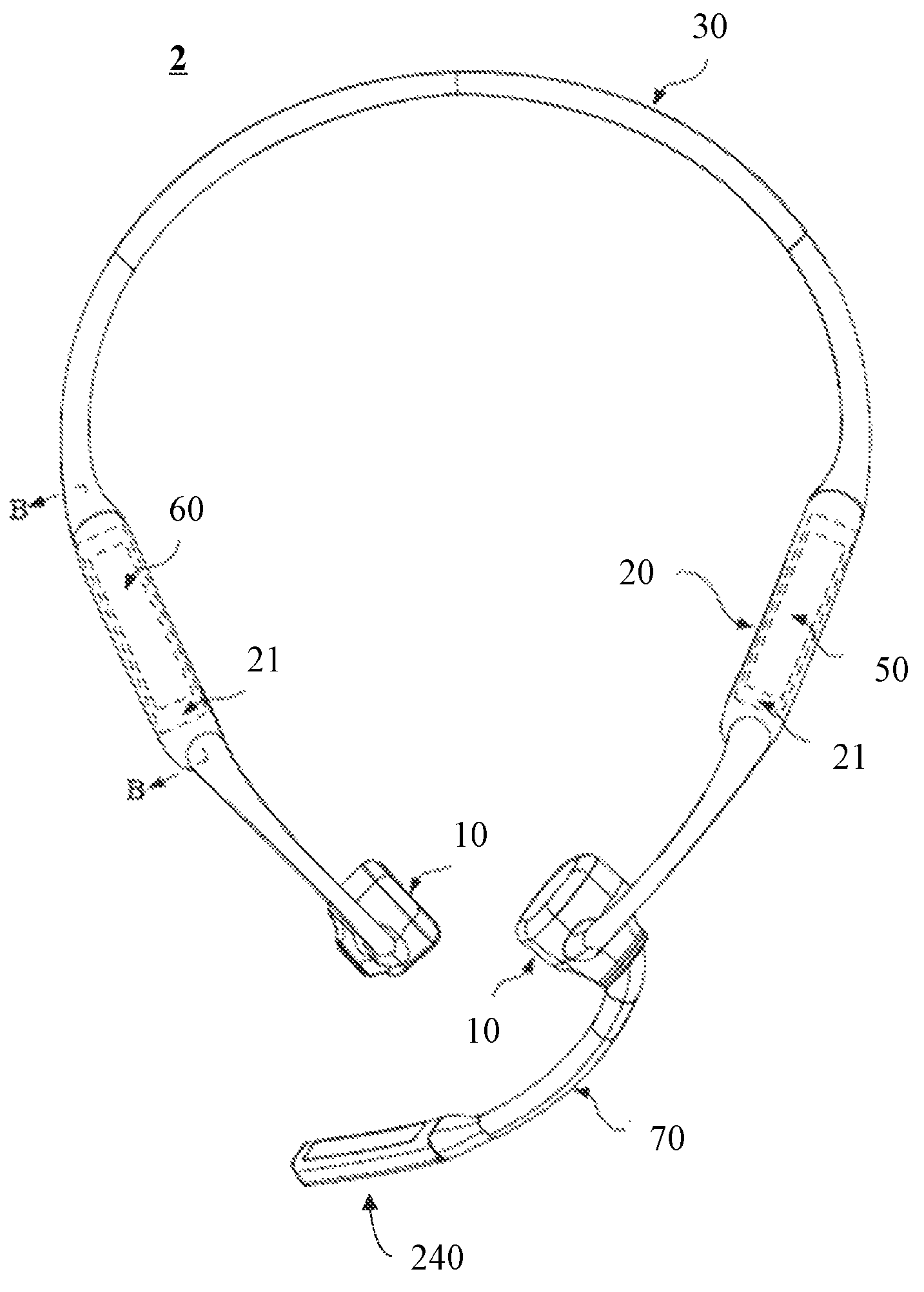
FIG. 2 is another structure diagram illustrating an exemplary acoustic device according to some embodiments of the present disclosure.
Figure 3:
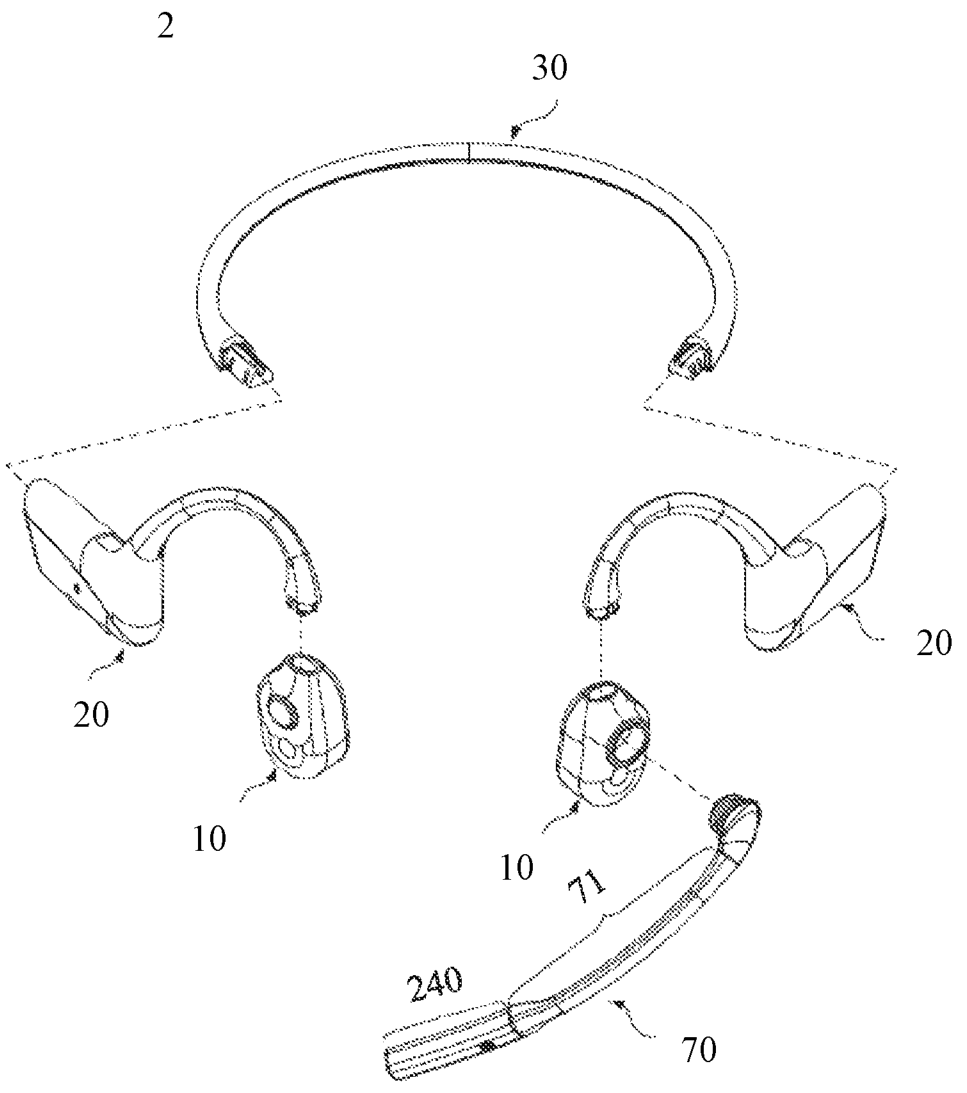
FIG. 3 is an exploded view illustrating a structure of an exemplary acoustic device according to some embodiments of the present disclosure.

FIG. 2 is a structure diagram illustrating an exemplary acoustic device according to some embodiments of the present disclosure. FIG. 3 is an exploded view illustrating a structure of an exemplary acoustic device according to some embodiments of the present disclosure.

In some embodiments, as shown in FIGS. 2 and 3, an acoustic device 2 may include an audio input component 70. The audio input component 70 may include an elastic connecting rod 71 and one or more sound pickup components 240. An end of the elastic connecting rod 71 may be connected with the speaker component 10. Another end of the elastic connecting rod 71 may be connected with the one or more sound pickup components 240. In some embodiments, the sound pickup component 240 may be the same or similar to the sound pickup component 140.

In the present disclosure, an acoustic device (such as the acoustic device 100, the acoustic device 1, the acoustic device 2) may include an earphone, a hearing aid, an intercom device, a speaker, a smart glass, etc., or other devices with acoustic output capability. Taking the hearing aid as an example, the existing hearing aid is a small loudspeaker, which may enlarge inaudible sound, and then the sound may be transmitted to the auditory center of the brain with the residual hearing of a hearing-impaired. However, due to the hearing impairment or degradation of the hearing-impaired, the improvement of the hearing effect of the traditional auditory canal transmission method for the hearing-impaired may be relatively limited. The bone conduction technique of the present disclosure may break through the traditional sound transmission mode of the ear canal, effectively improve the hearing effect of the hearing-impaired, and enable the hearing-impaired to receive clearer and more stable sound.

Figure 4:
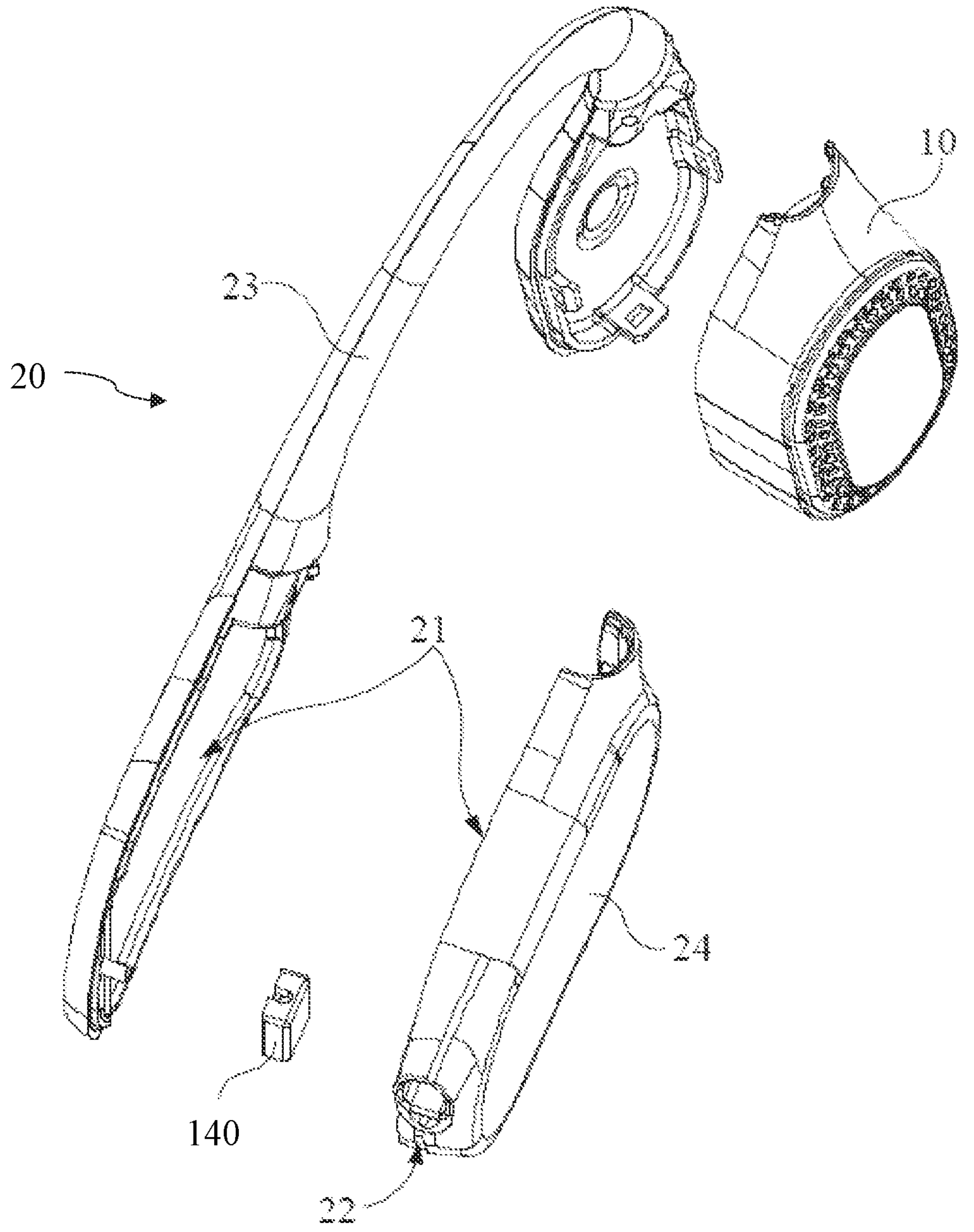
FIG. 4 is a schematic diagram illustrating disassembled structures of an exemplary hanger assembly according to some embodiments of the present disclosure.
Figure 5:
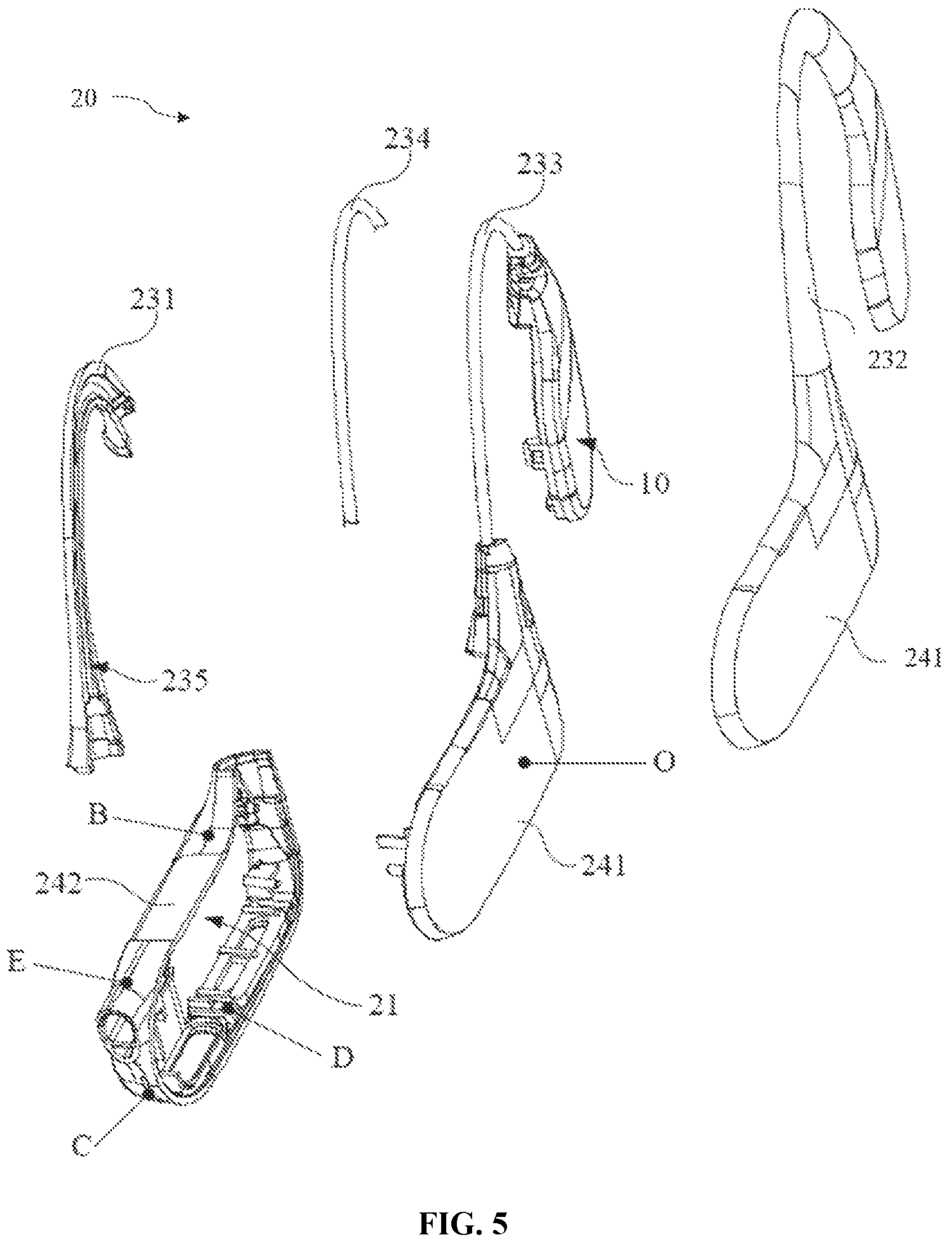
FIG. 5 is another schematic diagram illustrating disassembled structures of an exemplary hanger assembly according to some embodiments of the present disclosure.

FIG. 4 is a schematic diagram illustrating disassembled structures of an exemplary hanger assembly according to some embodiments of the present disclosure. FIG. 5 is another schematic diagram illustrating disassembled structures of an exemplary hanger assembly according to some embodiments of the present disclosure. As shown in FIG. 4, the hanger assembly 20 may include a shell 24. The shell 24 may form a space 21 for accommodating the battery assembly 50, the control circuit assembly 60 and/or the sound pickup component 140.

In some embodiments, the hanger assembly 20 may also include a connecting component. An end of the connecting component 23 may be connected with a shell 24. Another end of the connecting component 23 may be connected with the speaker component 10. In some embodiments, as shown in FIG. 5, the shell 24 may include a first shell 241 and a second shell 242. The first shell 241 may be connected with the second shell 242 to form a space 21. In some embodiments, the first shell 241 may be physically connected with the connecting component 23. For example, the first shell 241 may be fixedly connected with an end of the connecting component 23 by injection molding. As another example, the first shell 241 may be connected with an end of the connecting component 23 by welding, riveting, bonding, clamping, or the like. In some embodiments, the second shell 242 may be physically connected with the first shell 241. For example, the second shell 242 may be physically connected with the first shell 241 by connection such as clamping, riveting, or the like. In some embodiments, the first shell 241 and the second shell 242 may be physically connected with the connecting component 23. For example, the first shell 241 and the second shell 242 may be connected with an end of the connecting component 23 by injection molding.

In some embodiments, as shown in FIG. 5, the connecting component 23 may include a first elastic coating 231, a second elastic coating 232, and an elastic support component 233. An end of the elastic support component 233 may be connected with the shell 24 (such as the first shell 241), and another end of the elastic support component 233 may be connected with the speaker component 10. In some embodiments, a wire 234 may be arranged in the connecting component 23. In some embodiments, an end of the wire 234 may be electrically connected with a battery assembly or a control circuit assembly arranged in the space 21, and another end of the wire 234 may be electrically connected with the speaker component 10.

In some embodiments, the first elastic coating 231 and the second elastic coating 232 may be molded by injection molding (e.g., two-color injection molding). In some embodiments, the first elastic coating 231 and the second elastic coating 232 may wrap the elastic support component 233 and the wire 234. In some embodiments, the elastic support component 233 may wrap the wire 234, and the first elastic coating 231 and the second elastic coating 232 may wrap the elastic support component 233. For example, the elastic support component 233 may be in a hollow structure. The wire 23 may be located in the elastic support component 233. In some embodiments, the elastic support component 233 may be curved and have a certain stiffness/strength to facilitate the user to wear the acoustic device. The first elastic coating 231 and the second elastic coating 232 may protect the elastic support component 233 and the wire 234 wrapped therein. In some embodiments, the first elastic coating 231 and the second elastic coating 232 may be made of rubber, plastic, fiber, or other materials with certain elasticity, to improve the comfort of the acoustic device in wearing. In some embodiments, an exposed surface of the first elastic coating 231 may be used as an inner side of the connecting component 23, and an exposed surface of the second elastic coating 232 may be used as an outer side of the connecting component 23. It should be noted that when the acoustic device is in the wearing state, the inner side of the connecting component 23 may be closer to the user's skin relative to the outer side of the connecting component 23. Most of the inner side of the connecting component 23 may be in contact with the user's ear and head.

In some embodiments, when making the connecting component 23, an auxiliary wire may be used. The auxiliary wire and the elastic support component 233 may be arranged side by side. In some embodiments, the auxiliary wire and the elastic support component 233 may have approximately the same structure parameters such as shape, length, radius of curvature, or the like. In some embodiments, the radius of the auxiliary wire may be greater than or equal to the diameter of the wire 234. Further, an elastic coating may be formed on the surface of the auxiliary wire and the elastic support component 233 by injection molding, then the auxiliary wire may pulled out, and the wire 234 may be threaded in the elastic coating at a location (that is, a position where the auxiliary wire is located before being pulled out), to form the connecting component 23. However, in a process of above-mentioned injection molding, the auxiliary wire and the elastic support component 233 have a certain length and radius of curvature, thus the auxiliary wire and the elastic support component 233 (especially a middle area between the auxiliary wire and the elastic support component 233) may deviate from original positions under the impact of injection molding, resulting in uneven wall thickness of the elastic coating. Thus, the molding quality of the connecting component 23 may be affected. In particular, when the wall thickness of the elastic coating is thin, during a long-term use of the acoustic device, the elastic coating on the surface of the connecting component 23 (e.g., the first elastic coating 231 and the second elastic coating 232) may break, thereby affecting the user experience.

In some embodiments, the elastic coating may be divided into a first elastic coating 231 and a second elastic coating 232. The first elastic coating 231 and the second elastic coating 232 may be injection molded in two times. Further, a groove 235 may be formed on one of the first elastic coating 231 and the second elastic coating 232. For example, the groove 235 may be formed on a side of the first elastic coating 231. The groove 235 may be arranged along an extension direction of the first elastic coating 231, and the groove may be configured to accommodate the elastic support component 233 and the auxiliary wire. Further, the second elastic coating 232 may be molded by injection molding on the side where the groove 235 of the first elastic coating 231 is located, and the second elastic coating 232 may cover the elastic support component 233 and the auxiliary wire. Thus, after the first elastic coating 231 and the second elastic coating 232 are combined, the auxiliary wire may be pulled out to form a wire channel (not shown) arranged in parallel with the elastic support component 233 and connected with the space 21. The wire channel may be used for threading the wire 234. Because the groove 235 may have a certain depth, the first elastic coating 231 may wrap a portion of the elastic support component 233 and the auxiliary wire to limit the elastic support component 233 and the auxiliary wire. Thus, the elastic support component 233 and the auxiliary wire may withstand the impact of injection molding. In some embodiments, the depth of the groove 235 may be equal to a radius of one of the elastic support component 233 and the auxiliary wire with the larger diameter. In some embodiments, the depth of the groove 235 may be greater than the radius of one of the elastic support component 233 and the auxiliary wire which has the larger diameter. In some embodiments, the count of the groove 235 may be two. The two grooves 235 may be arranged in parallel and configured to place the elastic support component 233 and the auxiliary wire, respectively. Thus, the channels of the wire 234 and the elastic support component 233 may be separated from each other, so that the elastic support component 233 and the auxiliary wire (or wire 234) do not interfere with each other. In some embodiments, the count of the groove 235 may be one. The elastic support component 233 and the auxiliary wire may be both arranged in the groove 235, which may simplify the structure of the connecting component 23.

In some embodiments, the shell 24 may be connected with an end of the connecting component 23 (e.g., the elastic support component 233) by injection molding. In some embodiments, the second elastic coating 232 may further cover at least a portion of the outer surface of the shell 24, and the first elastic coating 231 may be located between the shell 24 and the speaker component 10 without covering the outer surface of the shell 24. For example, the second elastic coating 232 may cover the outer surface of the first shell 241, and the first elastic coating 231 may be located between the second shell 242 and the speaker component 10 without covering the outer surface of the second shell 242.

In some embodiments, a molding process of the hanger assembly 20 may include the following operations. In operation 1, the speaker component 10 and the first shell 241 may be formed at ends of the elastic support component 233. In operation 2, the first elastic coating 231 with the groove 235 may be obtained by injection molding. In operation 3, the first elastic coating 231 obtained in operation 2 may be assembled with a semi-finished product and auxiliary wire obtained in operation 1. In operation 4, the second elastic coating 232 may be formed on one side of the groove 235 of the first elastic coating 231 by injection molding to wrap the elastic support component 233, the auxiliary wire, and the outer surface of the first shell 241. In operation 5, the auxiliary wire of the semi-finished product obtained in operation 4 may be pulled out to form a wire channel, and then the wire 234 may be threaded in the wire channel. In operation 6, the second shell 242 may be matched and fixed with the first shell 241 of the semi-finished product obtained in operation 5 through one or one operations, such as gluing, clamping, or threaded connection, or combination thereof.

In some embodiments, as shown in FIG. 4, the hanger assembly 20 may be provided with a sound pickup hole (also referred to as a third hole) 22. The third hole 22 may be connected with the space 21 and the outside. The sound pickup component 140 may be arranged in the space 21 adjacent to the third hole 22. Thus, the sound pickup component 140 may obtain sounds through the third hole 22. The third hole 22 and the sound pickup component 140 may be arranged at any position on the acoustic device. However, it is found that the closer the sound pickup component 140 is to the speaker component 10, the more the sound pickup may be affected by the speaker component, and the easier to cause a phenomenon of “howling” due to an acoustic coupling between the sound pickup component and the speaker component. During a process of sound generation, the speaker component 10 may drive the external air to vibrate together, that is, a phenomenon “sound leakage”. In some embodiments, the third hole 22 may be provided on a side of the shell 24 away from the speaker component 10. For example, as shown in FIG. 5, the third hole 22 may be provided at a position C on the second shell 242. This arrangement may avoid the phenomenon “sound leakage” caused by the speaker component 10 and picked up by the sound pickup component 140 as much as possible, thereby reducing the interference of the speaker component 10 to the sound pickup component 140. For example, a mechanical vibration generated by the speaker component 10 and transmitted to the sound pickup component 140, which makes the phenomenon of “howling” or noises by the sound pickup component 140, may be reduced. In some embodiments, the third hole 22 may be provided at other positions of the shell 24. For example, as shown in FIG. 5, the third hole 22 may be provided at a position O on the first shell 241 or positions B, D, and E on the second shell 242. In some embodiments, the third hole 22 may be provided on a side of the shell 24 close to the speaker component 10, or on a side facing the user’s head when the shell 24 is worn, or on the side facing away from the user’s head when the shell 24 is worn. In some embodiments, in order to be away from the speaker component 10, the third hole 22 may be arranged at any position of the rear hanger assembly 30. For example, the third hole 22 may also be arranged in a middle position of the rear hanger assembly 30.

Figure 6:
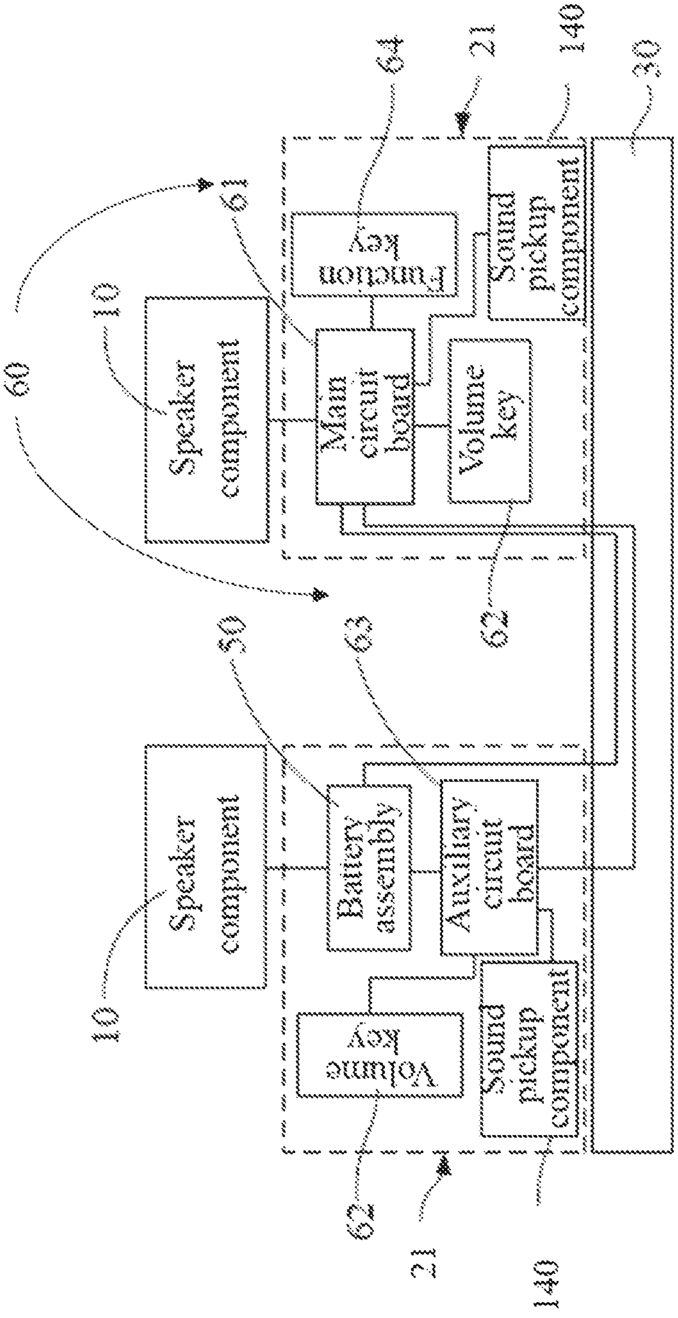
FIG. 6 is a structure diagram illustrating an exemplary control circuit assembly according to some embodiments of the present disclosure.
Figure 7:
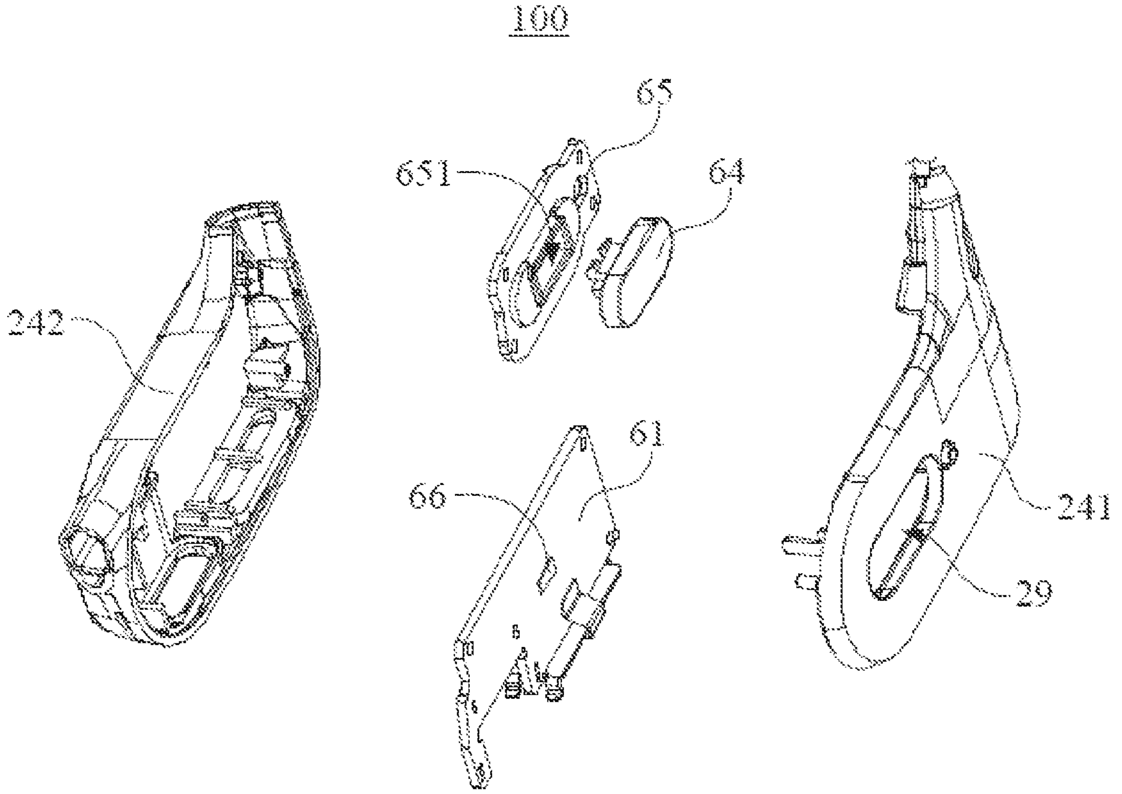
FIG. 7 is a schematic diagram illustrating disassembled structures of an exemplary shell of the hanger assembly according to some embodiments of the present disclosure.
Figure 8:
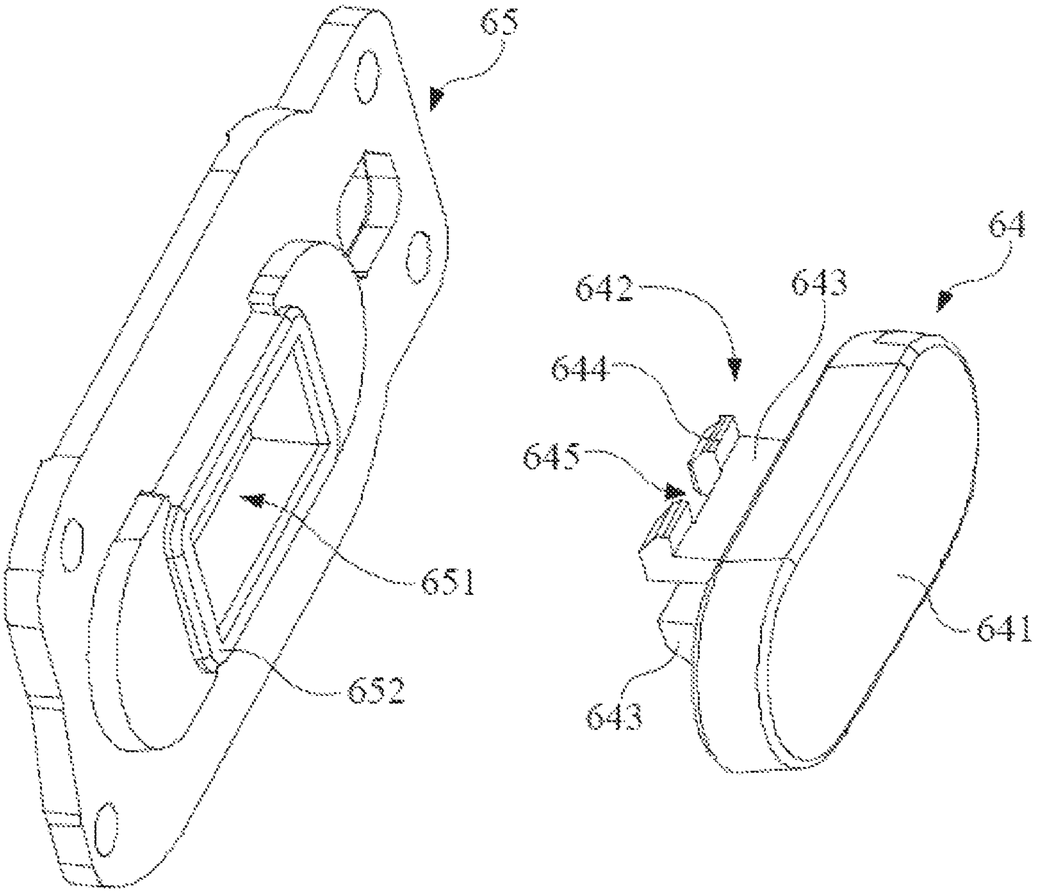
FIG. 8 is a schematic diagram illustrating disassembled structures of exemplary keys and a protection plate according to some embodiments of the present disclosure.
Figure 9:
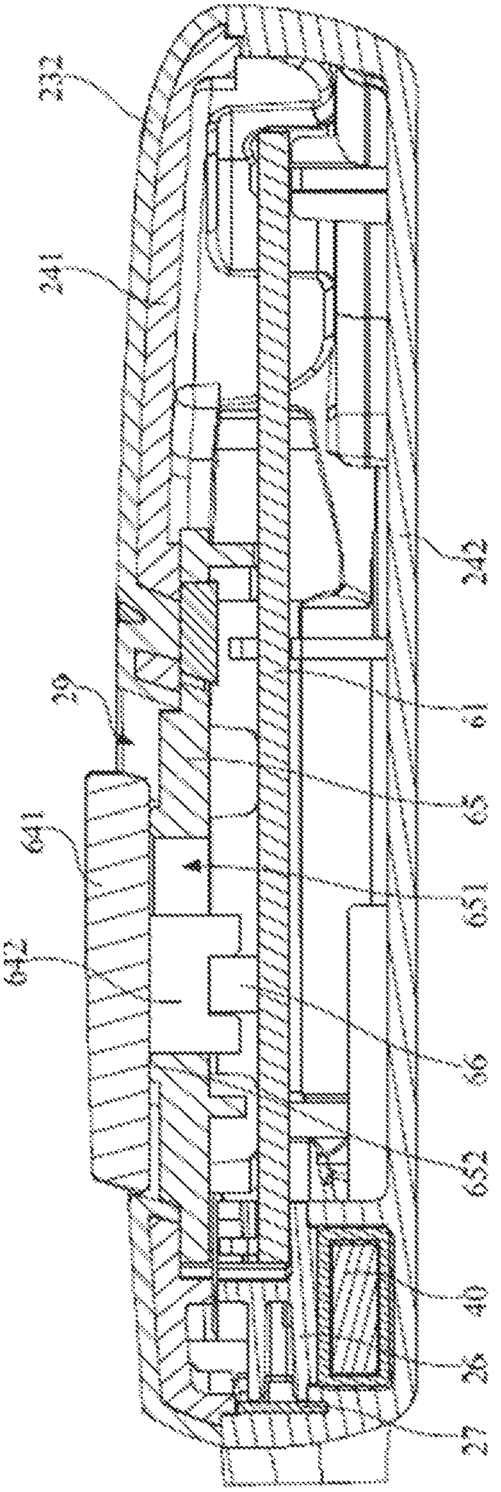
FIG. 9 is a structure diagram illustrating a cross-section of an exemplary hanger assembly along a toggle direction of a key according to some embodiments of the present disclosure.

FIG. 6 is a structure diagram illustrating an exemplary control circuit assembly according to some embodiments of the present disclosure. FIG. 7 is a schematic diagram illustrating disassembled structures of an exemplary shell of the hanger assembly according to some embodiments of the present disclosure. FIG. 8 is a schematic diagram illustrating disassembled structures of exemplary keys and a protection plate according to some embodiments of the present disclosure. FIG. 9 is a structure diagram illustrating a cross-section of an exemplary hanger assembly along a toggle direction of a key according to some embodiments of the present disclosure.

In some embodiments, the control circuit assembly 60 may include a main circuit board 61 and an auxiliary circuit board 63. The interaction component may include one or more keys (e.g., a volume key 62, a function key 64) and one or more switches (e.g., a switch 66). As shown in FIG. 6, the main circuit board 61 may be arranged in the space 21 of a shell 24, and the battery assembly 50 may be arranged in the space 21 of another shell 24, to balance a weight distribution of the acoustic device.

In some embodiments, the main circuit board 61 may directly control components electrically connected with the main circuit board 61 and components electrically connected with the battery assembly 50 in the acoustic device. For example, two independent audio processing chips (not shown) may be integrated on the main circuit board 61 to independently control the audio gain of the two speaker components 10. Merely by way of example, the two audio processing chips may be digital signal processor (DSP) chips. In some embodiments, the auxiliary circuit board 63 and the battery assembly 50 may be arranged in the space 21 of the same shell. In some embodiments, the main circuit board 61 may control components electrically connected with the auxiliary circuit board through the auxiliary circuit board 63.

In some embodiments, as shown in FIG. 6, the interaction component may include two volume keys 62. At least a portion of each of the two volume keys 62 may be arranged on the shell 24 or in the space 21 of the shell 24. A user may control an audio processing chip corresponding to one of the volume keys 62 on the main circuit board 61 by pressing the corresponding volume key, to adjust the audio gain of the speaker component 10 corresponding to the audio processing chip. Merely by way of example, each shell 24 may be provided with a hole for a volume key corresponding to a volume key of the volume keys 62 in the shell 24, which may be a through hole connecting with the space 21 and the outside of the shell 24. In some embodiments, each of the two volume keys 62 may be exposed through a hole for a corresponding volume key for the user to press. In some embodiments, the auxiliary circuit board 63 may be coupled with the volume key 62 corresponding to the hole for the volume key and coupled with the main circuit board 61. Thus, the main circuit board may implement a pressing operation of the volume key 62 coupled with the auxiliary circuit board 63.

As shown in FIG. 6, the function key 64 may be arranged in the space 21 of the shell 24 where the main circuit board 61 is located, and the function key 64 may be physically connected with the main circuit board 61. In some embodiments, the volume of the main circuit board 61 may be smaller than the volume of the battery assembly 50, so that the space 21 may have a space for accommodating the function key 64. In some embodiments, the function key 64 may replace the volume key 62, or the function key 64 may coexist with the volume key 62. The function key 64 may implement functions such as play/pause, switch on/off, etc., to expand the interaction ability between the acoustic device and the user.

In some embodiments, as shown in FIG. 7, the shell 24 provided with the main circuit board 61 may be provided with a first hole (also known as a sliding hole) 29. The first hole 29 may be connected with the space 21, and the function key 64 may be movably arranged in the first hole 29 to toggle the switch 66, to trigger the control circuit assembly 60 to implement the functions corresponding to the switch 66 (e.g., play/pause, switch on/off, etc.).

In some embodiments, as shown in FIGS. 7 and 8, the acoustic device may also include a protection plate 65. The protection plate 65 may be arranged in the space 21 of the shell 24 where the main circuit board 61 is located, and the protection plate 65 may be physically connected with the shell 24 to form a waterproof barrier between the main circuit board 61 and the shell 24. In some embodiments, the protection plate 65 may be provided with a second hole 651. The second hole 651 may be arranged corresponding to the first hole 29. For example, the second hole 651 may be coaxial with the first hole 29 and the size of the second hole 651 may be equal to the size of the first hole 29. The function key 64 may be movably arranged in the first hole 29 and the second hole 651 to toggle the switch 66 on the main circuit board 61 of the control circuit assembly 60 and implement the functions corresponding to the switch 66 (e.g., play/pause, switch on/off, etc.).

In some embodiments, as shown in FIGS. 8 and 9, the function key 64 may include a movable part (also known as a sliding part) 641 and a connecting part 642. In some embodiments, the movable part 641 and the connecting part 642 may be integrally formed. In some embodiments, the movable part 641 may be physically connected with the connecting part 642. The connecting part 642 may be arranged on a side of the movable part 641 facing the switch 66 and protrude in a direction away from the movable part 641. The movable part 641 or a portion of the movable part 641 may be located in the first hole 29. The user may press the movable part 641. The side of the movable part 641 away from the connecting part 642 may be exposed to the outside through the first hole 29. In some embodiments, the user may press the movable part 64 to drive the connecting part 642 to move to the switch 66, to apply pressure to the switch 66 to trigger the switch. In some embodiments, the connecting part 642 may be physically connected with the switch 66, and the user may drive the switch to move by pressing or sliding the movable part 64 to trigger the switch.

In some embodiments, the connecting part 642 may include two connecting plates 643. The two connecting plates 643 may be arranged substantially parallel to each other and substantially perpendicular to the surface of the movable part 641. An end of each of the two connecting plates 643 may be connected with the movable part 641, and another end of each of the two connecting plates 643 may be provided with a connector (also known as a snap) 644 to connect the protective plate 65. That is, the connector 644 may be arranged at another end of each of the two connecting plates 643 away from the movable part 641. A connector 644 may protrude in a direction away from another connector 644, thus the connecting part 642 may clamp the side of the protection plate 65 away from the movable part 641.

In some embodiments, the another end of each of the two connecting plates 643 away from the movable part 641 may be provided with an accommodation area (also known as a switch accommodation area) 645. The accommodation area 645 may be configured to accommodate the switch 66 to make the function key 64 toggle the switch 66. In this way, on the one hand, the function key 64 may contact the switch 66 through the accommodation area 645, thus the user may toggle the switch 66 by pressing the function key 64. On the other hand, the function key 64 may also be clamped with the protection plate 65 to prevent the function key 64 from falling off from the shell 24, and improve the waterproof and dustproof performance of the shell 24 at the function key 64.

In some embodiments, as shown in FIG. 8, a surface of the protection plate 65 facing the movable part 641 may be provided with protrusions 652 (also referred to as a protruded platform) around an edge of the second hole 651. The protrusions 652 may be arranged along a direction of circumference of the second hole 651. In this way, when the function key 64 is clamped with the shell 24 and the protection plate 65, the protrusions 652 may contact the surface of the movable part 641. The connecting part 642 may pass through the first hole 29 and the second hole 651, and may be movable in the first hole 29 and the second hole 651 to toggle the switch 66. During the movement of the connecting part 642 in the second hole 651, the protrusions 652 may always contact the surface of the movable part 641, to ensure the waterproof and dustproof performance of the shell 24 at the function key 64.

It should be noted that the above description of the structure of the function key 64 is merely for an example. In addition, the function key 64, the protection plate 65, and the shell 24 may cooperate to form a waterproof key assembly.

It should be noted that according to the above description, an end of the rear hanger assembly 30 of the acoustic device may be provided with a hanger assembly 20 and a speaker component 10 corresponding to the hanger assembly 20, a sound pickup component 140, a battery assembly 50, an auxiliary circuit board 63 and a volume key 62. Another end of the rear hanger assembly 30 of the acoustic device may be provided with a hanger assembly 20, a speaker component 10, a sound pickup component 140, a main circuit board 61 and a volume key 62, which are corresponding to the hanger assembly 20. The above components arranged at ends of the rear hanger assembly 30 may be electrically connected with each other through the wires built into the rear hanger assembly 30 to implement control instructions, transmission of electrical signals, or the like. According to the above description, each hanger assembly 20 may be connected with a speaker component 10. When the user wears the acoustic device, the two speaker components 10 may be located on sides of the user's head respectively, to form stereo, thus the acoustic expressiveness of the acoustic device may be improved.

In some embodiments, the two speaker components 10 may be electrically connected with the main circuit board 61, and the two speaker components 10 may be adjusted by the same volume key 62. In this case, the volume of the two speaker components 10 may be increased or decreased synchronously under adjustment of the volume key 62. Although this arrangement may simplify control of the adjustment of the speaker components 10 and the structure of the whole machine. However, for users with abnormal hearing, the arrangement may cause sound heard by the user with an effect of "loud sound in a side, and whisper in another side", affecting the user's experience. Therefore, in the present disclosure, the volume keys 62 may be respectively arranged on the two hanger assemblies 20 to adjust the corresponding speaker component 10 respectively. Thus, the user may adjust the two speaker components 10 adaptively according to an actual use requirement.

Figure 10:
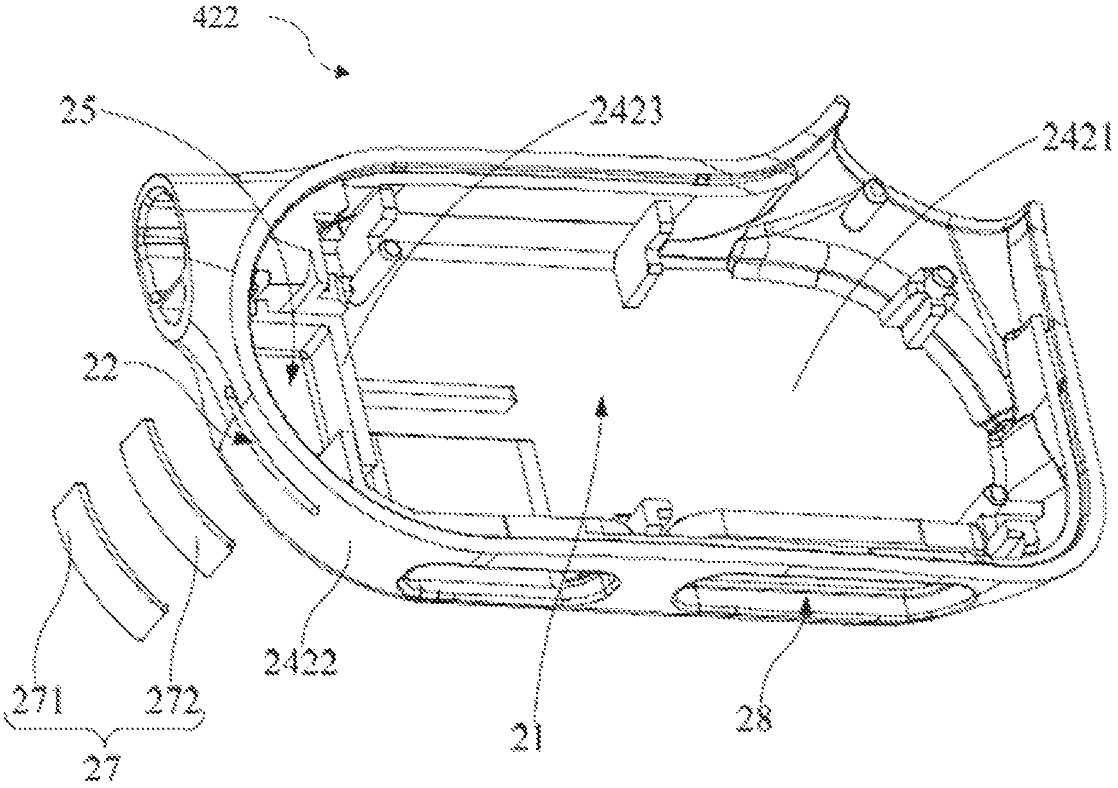
FIG. 10 is a structure diagram illustrating an exemplary second shell of the hanger assembly according to some embodiments of the present disclosure.

FIG. 10 is a structure diagram illustrating an exemplary second shell of the hanger assembly according to some embodiments of the present disclosure. As shown in FIG. 10, an accommodation groove 25 for accommodating the sound pickup component 140 may be provided in the space 21. In some embodiments, a bottom wall 2421 of the second shell (e.g., an inner surface of the bottom wall 2421) may be provided with a flange 2423, and the flange 2423 may form a side wall of the accommodation groove 25, and limit and fix the sound pickup component 140. In some embodiments, the flange 2423 and at least a portion of the side wall of the second shell may form a side wall containing the accommodation groove 25.

It is found that if the sound pickup component 140 is directly connected with the outside through the third hole 22, the sound path between the sound pickup component 140 and the outside will be short. When the acoustic device is in a complex environment (e.g., the air flow is violent), the sound pickup component 140 may pick up more noises, which may cause a phenomenon of "wind noise". The phenomenon of "wind noise" may refer to a phenomenon that the sound pickup component 140 picks up external noises and generates noises. Therefore, in the present disclosure, as shown in FIG. 9, a channel 26 may be arranged between the sound pickup component 140 and the third hole 22 to extend the sound path of the sound pickup component 140, thus to improve the pickup effect of the sound pickup component 140. In some embodiments, the channel 26 may be arranged in the space 21 and covered on the flange 2423, that is, the channel 26 may cover the accommodation groove 25 and press the sound pickup component 140 into the accommodation groove 25.

In some embodiments, as shown in FIG. 10, the third hole 22 may be a shape of a narrow gap to increase the contact area between the sound path of the sound pickup component 140 and the outside, thereby improving the pickup effect of the sound pickup component 140. Merely by way of example, a width of the third hole 22 may be 0.1-2 mm. A length of the third hole 22 may be 10-100 times than the width of the third hole 22. However, if the contact area between the sound path of the sound pickup component 140 and the outside is too large, the phenomenon of "wind noise" may be caused and the waterproof and dustproof performance of the hanger assembly 20 may be reduced. Thus, in some embodiments, the acoustic device may include a protection net 27. The protection net 27 may be arranged on the sound path of the sound pickup component 140. Merely by way of example, as shown in FIG. 9, the protection net 27 may be butted between the channel 26 and the shell 24, to increase ability of preventing wind and reducing the noise of the sound pickup component 140 and improve the waterproof and dustproof performance of the hanger assembly 20. Merely by way of example, the protection net 27 may include one or more nets arranged in layers, for example, a first net 271 and a second net 272. In some embodiments, one or more nets may be made of different or the same materials. In some embodiments, the first net 271 may include a metal net, and the second net 272 may include a yarn net. Merely by way of example, the yarn net may be a net made of plastic (e.g., plastic filament) or fiber (e.g., polyester filament, nylon filament). In some embodiments, the second net 272 may be closer to the channel 26 than the first network 271. In some embodiments, the structure strength of the first network 271 may be greater than the structure strength of the second network 272. In some embodiments, the mesh number of the second net 272 may be greater than the mesh number of the first net 271, and the first net 271 cooperate with the second net 272 to make the protection net 27 have sufficient structure strength. Thus, the pickup requirements of the sound pickup component 140 and the waterproof and dustproof requirements of the hanger assembly 20 may be met.

It should be noted that a count of hanger assemblies 20 may be two, a count of sound pickup components 140 may also be two, and a count of channels 26 may also be two. Specifically, a sound pickup component 140 and a channel 26 may be respectively arranged in the space 21 of each hanger assembly 20 to improve the pickup effect of each sound pickup component 140.

Figure 11:
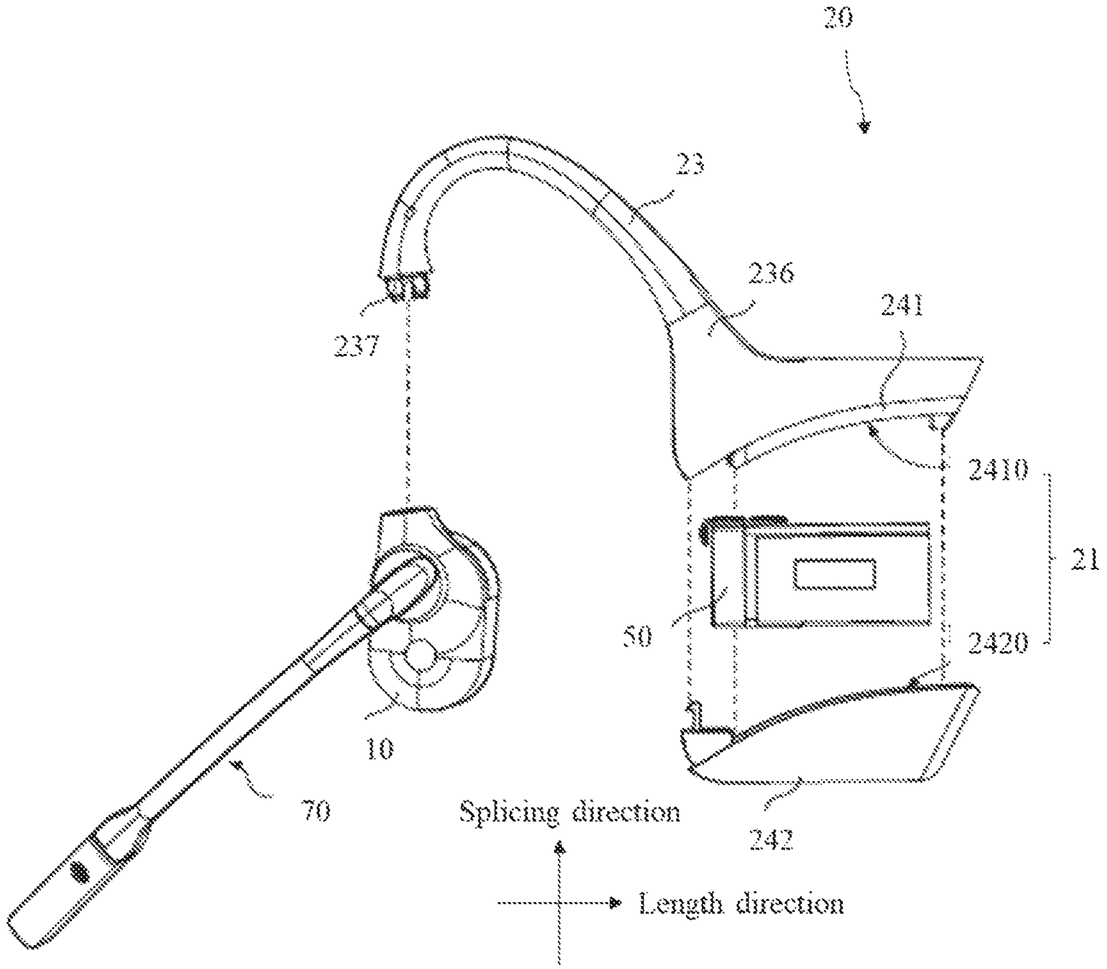
FIG. 11 is an exploded view illustrating structures of an exemplary hanger assembly according to some embodiments of the present disclosure.
Figure 12:
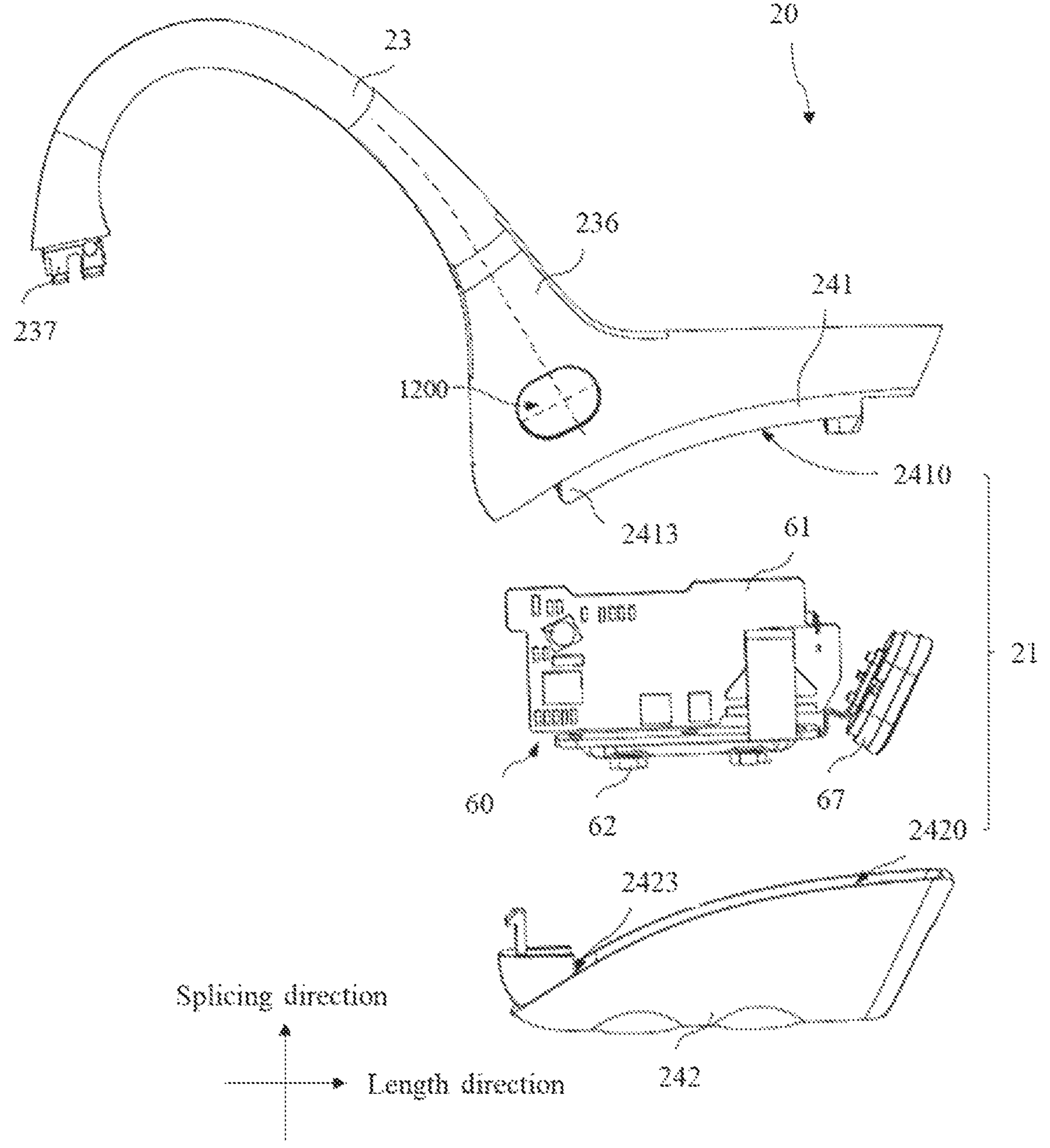
FIG. 12 is another exploded view illustrating a structure of an exemplary hanger assembly according to some embodiments of the present disclosure.
Figure 13:
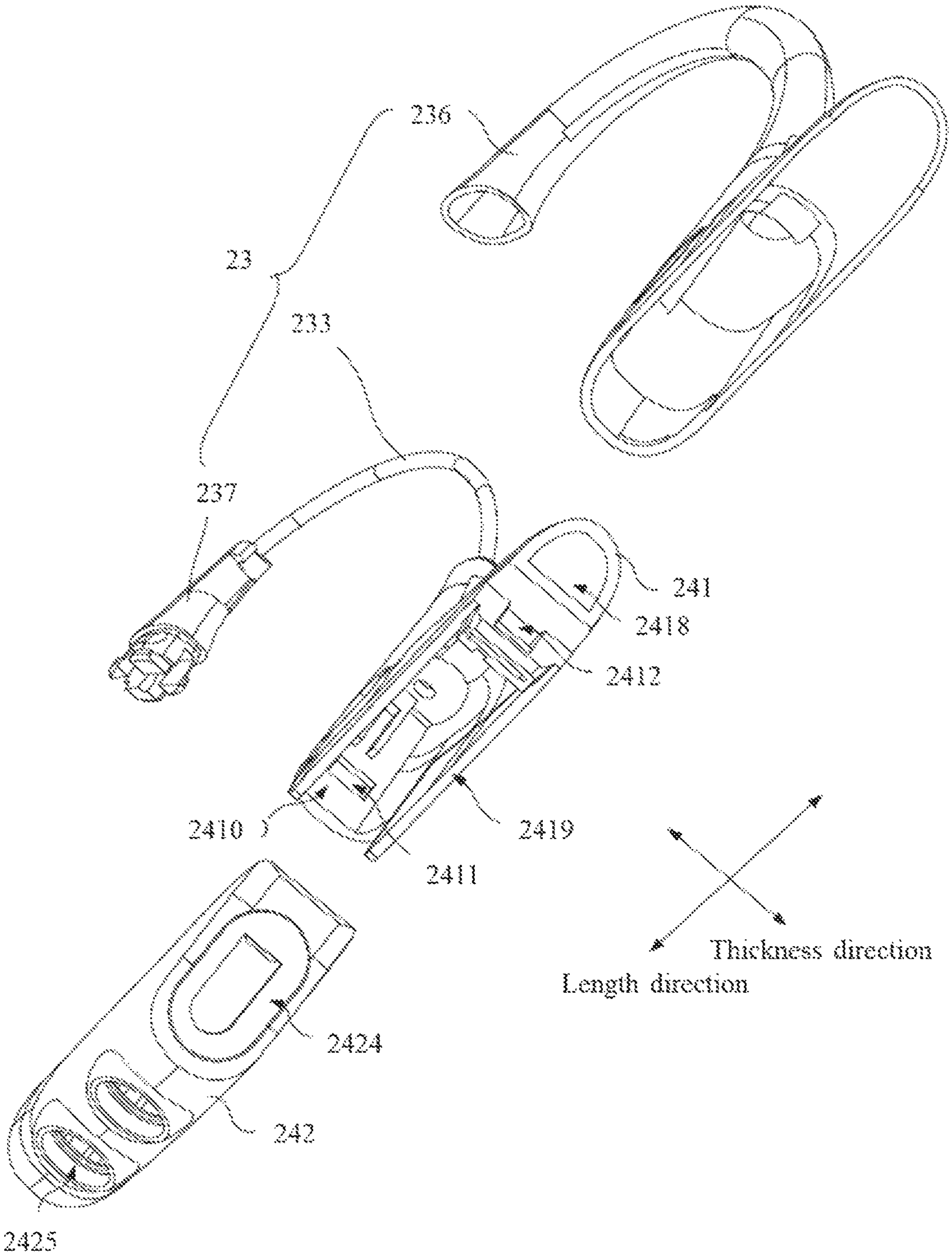
FIG. 13 is a structure diagram illustrating exemplary first shell and second shell of the hanger assembly according to some embodiments of the present disclosure.
Figure 14:
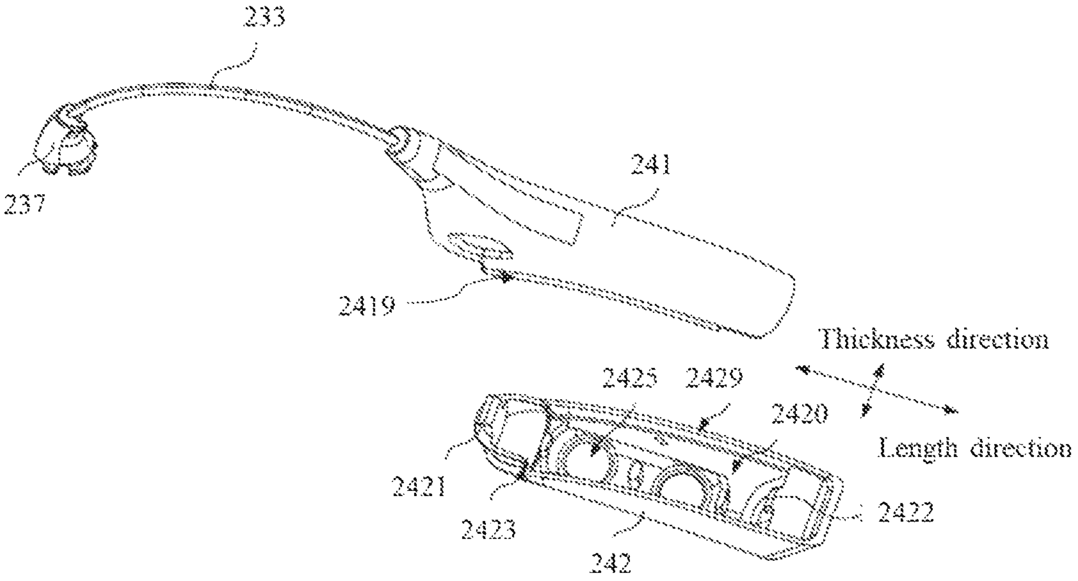
FIG. 14 is another structure diagram illustrating exemplary first shell and second shell according to some embodiments of the present disclosure.
Figure 15:
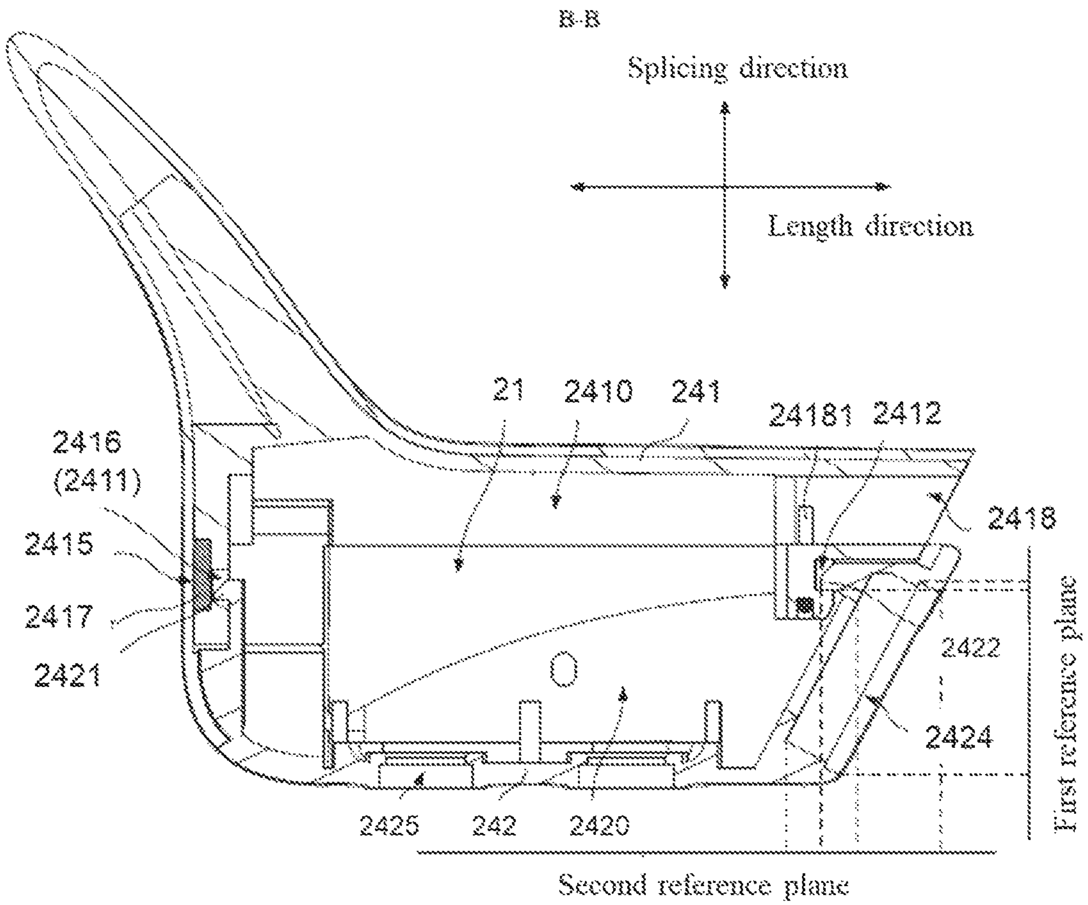
FIG. 15 is a structure diagram illustrating a cross-section of FIG. 2 with B-B line as a section line.
Figure 16:
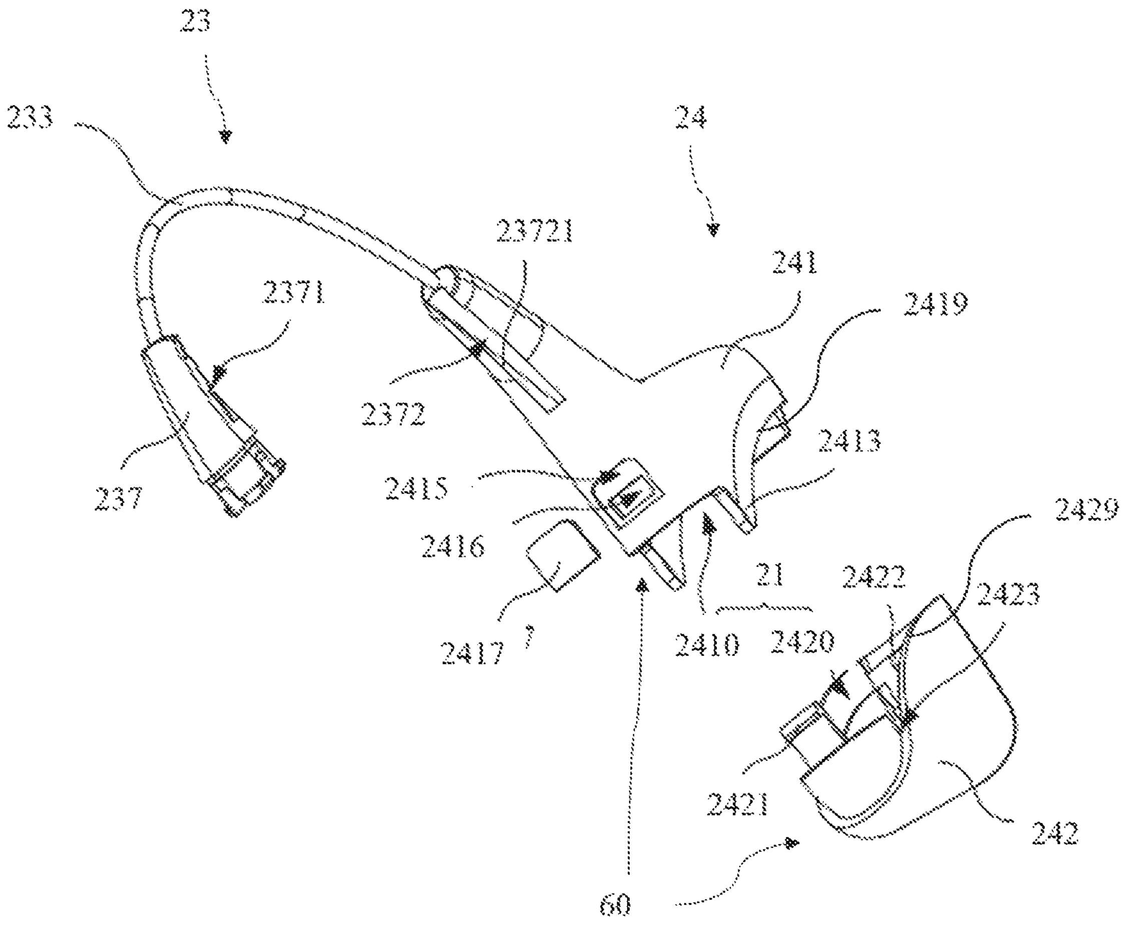
FIG. 16 is another structure diagram illustrating exemplary first shell and second shell according to some embodiments of the present disclosure.
Figure 17:
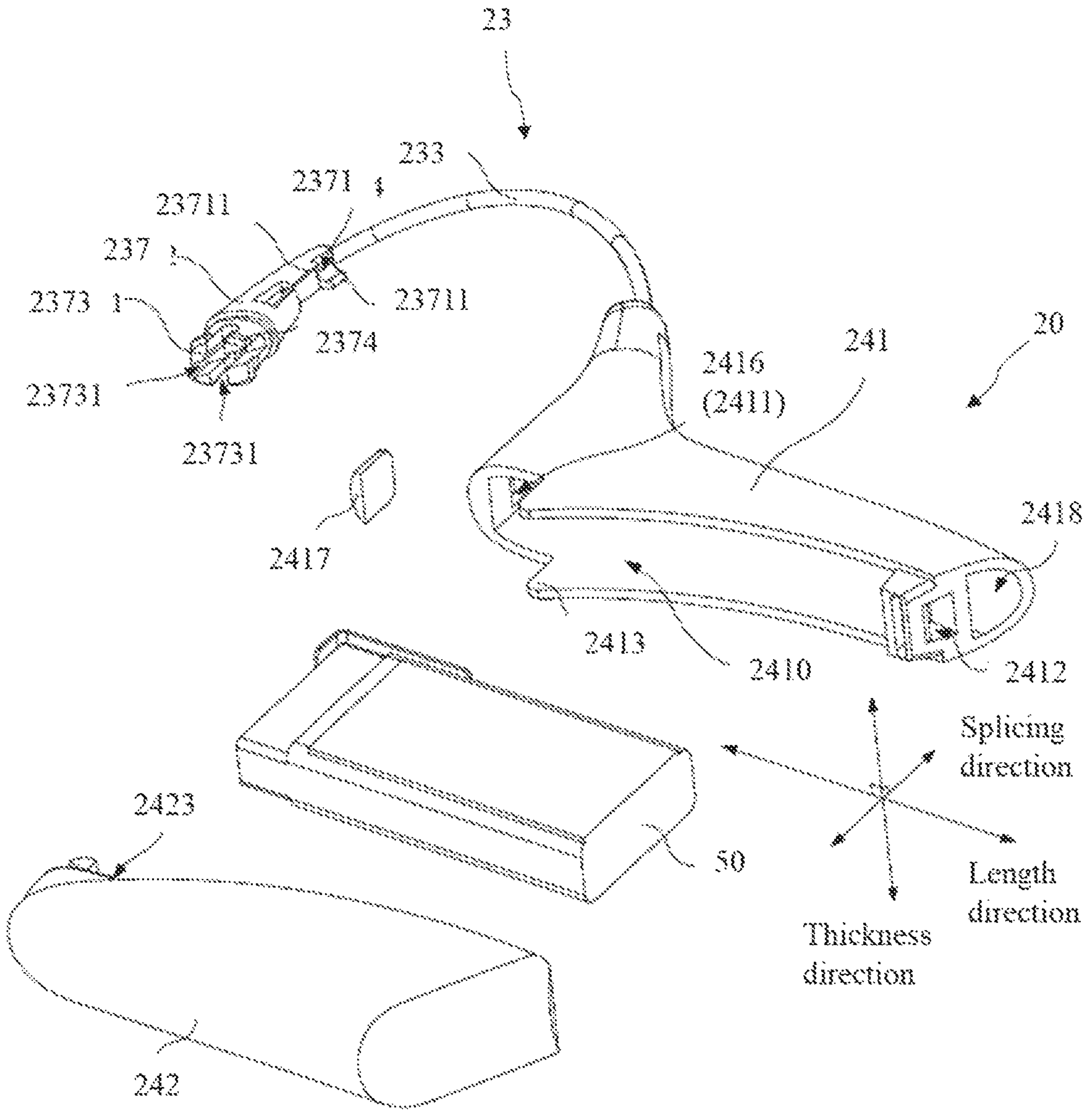
FIG. 17 is another exploded view illustrating structures of an exemplary hanger assembly according to some embodiments of the present disclosure.

FIG. 11 is an exploded view illustrating structures of an exemplary hanger assembly according to some embodiments of the present disclosure. As shown in FIG. 11, the space 21 of one of the two hanger assemblies 20 may be configured to accommodate the battery assembly 50. FIG. 12 is another exploded view illustrating a structure of an exemplary hanger assembly according to some embodiments of the present disclosure. As shown in FIG. 12, the space 21 of another one of the two hanger assemblies 20 may be configured to accommodate the control circuit assembly 60. FIG. 13 is a structure diagram illustrating exemplary first shell and second shell of the hanger assembly according to some embodiments of the present disclosure. FIG. 14 is another structure diagram illustrating exemplary first shell and second shell according to some embodiments of the present disclosure. FIG. 15 is a structure diagram illustrating a cross-section of FIG. 2 with B-B line as a section line. FIG. 16 is another structure diagram illustrating exemplary first shell and second shell according to some embodiments of the present disclosure. FIG. 17 is another exploded view illustrating structures of an exemplary hanger assembly according to some embodiments of the present disclosure.

In some embodiments, the acoustic device may be developed of portability and miniaturization. The hanger assembly 20 may be configured to arrange the battery assembly 50 and/or the control circuit assembly 60 and related wiring, etc., resulting in a larger volume of the hanger assembly 20 of the acoustic device. The design of the relevant snap structures in the hanger assembly 20 may also affect the volume of the hanger assembly 20. Therefore, in order to reduce the volume of the hanger assembly 20, as shown in FIGS. 11 and 12, the first shell 241 may be spliced to second shell 242 along a splicing direction perpendicular to a length direction and a thickness direction of the space 21 to form the shell 24. In some embodiments, the space 21 may be approximately regarded as a three-dimensional structure. The length direction may refer to a direction of the length of the space 21. The thickness direction may refer to a direction in which the thickness (i.e., width) of the space 21 is located and perpendicular to the length direction. The splicing direction may refer to a direction perpendicular to a splicing plane of the hanger assembly 20, that is, a direction of the height of the space 21 and perpendicular to the plane where the length direction and thickness direction is, that is, the direction in which the first shell 241 are spliced to the second shell 242. The splicing may mean to contact and connection between the first shell 241 and the second shell 242. Merely by way of example, as shown in FIGS. 11 and 12, the first shell 241 may have a first subspace 2410, and the second shell 242 may have a second subspace 2420. After the first shell 241 and the second shell 242 are spliced, the first subspace 2410 and the second subspace 2420 may be combined into the space 21.

As shown in FIG. 13, a first clamping groove 2411 and a second clamping groove 2412 may be arranged on the first shell 241 with an interval. As shown in FIG. 14, a first clamping block 2421 and a second clamping block 2422 may be arranged on the second shell 242 with an interval. The first clamping block 2421 may be embedded into the first clamping groove 2411, and the second clamping block 2422 may be embedded into the second clamping groove 2412 to clamp the first shell and the second shell, which may limit a relative movement of the first shell 241 and the second shell 242 in the splicing direction and thickness direction of the space 21. In some embodiments, the first clamping groove 2411 and the second clamping groove 2412 may be recessed along the length direction of the space 21, and a direction of an opening of the first clamping groove 2411 and a direction of an opening of the second clamping groove 2412 may be the same. In some embodiments, the first clamping block 2421 and the second clamping block 2422 may be protruded along the length direction of the space 21, and a direction of an extension of the first clamping block 2421 and a direction of an extension of the second clamping block 2422 may be the same. This arrangement may reduce the volume occupied by the first clamping block 2421 and the second clamping block 2422, and then reduce the volume occupied by the clamped first clamping block 2421 and the first clamping groove 2411, and the clamped second clamping block 2422 and the second clamping groove 2412, thereby effectively reducing the volume of the hanger assembly 20.

In some embodiments, the clamp of the first shell 241 and the second shell 242 may also limit the relative movement of the first shell 241 and the second shell 242 in the length direction of the space 21. In order to further limit the relative movement of the first shell 241 and the second shell 242 in the length direction, as shown in FIGS. 14 and 16, an edge part 2419 of the first shell 241 may be clamped into an edge part 2429 of the second shell 242 to limit the relative movement of the first shell 241 and the second shell 242 in the length direction to a certain extent. The edge part 2419 of the first shell 241 may refer to a portion of the first shell 241 close to the second shell 242. The edge part 2429 of the second shell 242 may refer to a portion of the second shell 242 close to the first shell 241.

In order to further limit the relative movement of the first shell 241 and the second shell 242 in the length direction, as shown in FIG. 16, the edge part 2419 of the first shell 241 may form a first limiting component (also known as the first stop component) 2413. The first limiting component 2413 may refer to an opening formed by the edge part 2419 of the first shell 241 towards a side of the first shell 241. The second shell 242 may be provided with a second limiting component 2423 (also known as a second stop component). The second limiting component 2423 may refer to a protrusion arranged on a side of the second shell 242. The protrusion and the opening may be on the same side of the shell 24. The first limiting component 2413 and the second limiting component 2423 may block the movement in the extension direction of each other, thereby limiting the relative movement of the first shell 241 and the second shell 242 in the length direction of the space 21.

The movement of the shell 24 in the splicing direction and the thickness direction of the space 21 may be limited by the clamp of the first clamping block 2421 and the first clamping groove 2411 and the clamp of the second clamping block 2422 and the second clamping groove 2412. The movement of the shell 24 in the length direction of the space 21 may further be limited by the clamp of the edge part 2419 and the edge part 2429 and the cooperation of the first limiting component 2413 and the second limiting component 2423. In this way, the splicing of the first shell 241 and the second shell 242 may be more stable, and the structure of the acoustic device may be more reliable.

In some embodiments, as shown in FIG. 13, the first clamping groove 2411 and the second clamping groove 2412 may be located on the first shell 241, and the first clamping groove 2411 and the second clamping groove 2412 may be located at ends in the length direction of the space 21, respectively. The direction of the opening of the first clamping groove 2411 may face the space 21. As shown in FIG. 15, the direction of the opening of the second clamping groove 2412 may deviate from the space 21. Merely by way of example, the first clamping groove 2411 may be arranged at an end of the first shell 241 close to the connecting component 23, and the second clamping groove 2412 may be arranged at an end of the first shell 241 away from the connecting component 23.

In some embodiments, as shown in FIG. 14, the first clamping block 2421 and the second clamping block 2422 may be located at ends of the second shell 242 along the length direction of the space 21, respectively. The direction of the extension of the first clamping block 2421 may deviate from the space 21. The direction of the extension of the second clamping block 2422 may face the space 21. Accordingly, the first clamping block 2421 can be arranged at one end of the second shell 242 close to the connecting component 23, and the second clamping block 2422 may be arranged at one end of the second shell 242 away from the connecting component 23. Compared with the direction away from the space 21, the direction of the extension of the second clamping block 2422 faces the space 21, so there is no need to occupy additional space, and the second clamping groove 2412 may be located in front of the direction of the extension of the second clamping block 2422 during clamping, thus the volume of the hanger assembly 20 may be reduced.

In some embodiments, the direction of the opening of the first clamping groove 2411 may face the space 21. If the first clamping groove 2411 is directly formed in the first subspace 2410, a draft direction of forming the first subspace 2410 may interfere a draft direction of forming the first clamping groove 2411 in the process of forming the first subspace 2410 and the first clamping groove 2411 with the corresponding mold. In addition, the draft direction of the first clamping groove 2411 may be in the first subspace 2410, thus the draft direction of the first clamping groove 2411 may conflict with a draft direction of other components, resulting in difficulties in production. In order to solve the above problems and reduce the difficulty of production and manufacturing, in some embodiments of the present disclosure, as shown in FIG. 16, the first shell 241 may be provided with an outer hole 2415 and an inner hole 2416 communicating with each other. The outer hole 2415 and the inner hole 2416 may be arranged coaxially. A diameter of the outer hole 2415 may be larger than a diameter of the inner hole 2416, thus a stepped hole through the first shell 241 may be formed. A filler 2417 may be provided in the outer hole 2415. The filler 2417 may be a rubber component, such as hard rubber. When the outer hole 2415 is filled by the filler 2417, the inner hole 2416 may be clamped with the first clamping block 2421 as the first clamping groove 2411. In the manufacturing process, the outer hole 2415 and the inner hole 2416 may be formed successively from the outside of the first shell 241 to the inside of the first shell 241. When the inner hole 2416 is formed, the mold may be drawn from the outer hole 2415. In this way, the draft direction of the outer hole 2415 and the draft direction of the inner hole 2416 may not be in the first subspace 2410, but outside the first shell 241. Thus, the manufacturing difficulty and complexity may be effectively reduced and the manufacturing cost may be saved. In a communication direction perpendicular to the outer hole 2415 and the inner hole 2416, a cross-sectional area of the outer hole 2415 may be greater than a cross-sectional area of the inner hole 2416, which may be convenient for arranging the filler 2417 in the outer hole 2415.

Based on the above arrangement, the manufacturing method of the hanger assembly 20 of the present disclosure may include the following operations. In operation 100, the first shell 241 and the second shell 242 may be formed by injection molding, and the outer hole 2415 and the inner hole 2416 communicating with each other may be formed on the first shell 241. In operation 200, a filler 2417 may be arranged in the outer hole 2415, and the inner hole 2416 may be used as the first clamping groove 2411. Merely by way of example, the filler 2417 may be filled in the outer hole 2415 by injection molding. In order to protect the first shell 241, the first shell 241 may be coated with an elastic coating 236 after the operation 200. Merely by way of example, the first shell 241 may be covered with the elastic coating 236 by injection molding, and the outer hole 2415 may be covered. In 300, the first shell 241 and the second shell 242 may be spliced through the clamp of the first clamping groove 2411 and the first clamping block 2421. The forming method of other component of the hanger assembly 20 may be manufactured by using the existing forming method on the basis of the specific structure of the hanger assembly 20, which may not be repeated herein.

In order to further reduce the volume of the hanger assembly 20, as shown in FIGS. 13 and 15, a power socket 2424 may be arranged on a portion of the second shell 242 (e.g., a side wall away from the connecting component 23). The power socket 2424 may communicate with the space 21. The power socket 2424 may be configured to accommodate a power interface, such as the power interface 67 of the control circuit assembly 60 shown in FIG. 12. Specifically, the second shell 242 may have a bottom and a side. The side may surround and connect the bottom to form a second subspace 2420. A portion of the side away from the bottom may be used as an edge part 2429 spliced with the first shell 241. The power socket 2424 may be arranged on the side of the shell away from the connecting component 23 to communicate with the second subspace 2420. As shown in FIG. 15, the second clamping block 2422 may be arranged adjacent to the power socket 2424. The second clamping block 2422 may be protruded from the portion of the second shell 242 away from the connecting component 23, and the second clamping block 2422 may be toward the space 21. In the embodiment, the second clamping block 2422 may be closer to the space 21 and/or the connecting component 23 than the power socket 2424.

In some embodiments, as shown in FIG. 15, a projection of the second clamping block 2422 and a projection of the power socket 2424 on a first reference plane perpendicular to the length direction of the space 21 overlap. The first reference plane may refer to a plane perpendicular to the length direction of the space 21. Overlapping may include a portion overlap (i.e., a portion of the projection of the second clamping block 2422 and the projection of the power socket 2424 overlap) and a full overlap (i.e., the projection of the second card block 2422 and the projection of the power socket 2424 overlap completely). This arrangement may make the structure of the second shell 242 compact, and reduce the volume of the hanger assembly 20 without affecting the installation of the power interface (e.g., the power interface 67 of the control circuit assembly 60). In some embodiments, the projection of the second clamping block 2422 and the projection of the power socket 2424 on the second reference plane perpendicular to the splicing direction may overlap. The second reference plane may refer to a plane perpendicular to the splicing direction. The above arrangement may make the structure arrangement of the second clamping block 2422 and the power socket 2424 more compact in both the splicing direction and the length direction, and the space occupied by the power socket 2424 and the second clamping block 2422 may be greatly saved.

The acoustic device may include one or more volume keys, such as the volume key 62 of the control circuit assembly 60. In some embodiments, a hole 2425 for a key (i.e., key hole) and the power socket 2424 corresponding to the volume key 62 may be arranged at the bottom of the second shell 242. Due to the limited area of the bottom, the hole 2425 and the power socket 2424 need to be arranged compactly. A size of the hole 2425 may be small and closely arranged with the power socket 2424. The user's control experience may thus be reduced and an incorrect operation may be easily caused. In some embodiments, the power socket 2424 may not be arranged at the bottom of the second shell 242, but at the side of the second shell 242. In this way, the hole 2425 may have a large volume and may be loosely arranged with other holes for keys, to facilitate the user's operation, reduce the occurrence of the incorrect operation and improve the operation experience of the acoustic device.

The stable splicing structure between the first shell 241 and the second shell 242 may protect the battery assembly 50 and the control circuit assembly 60 in the space 21. In order to reduce the failure rate of acoustic device, it is necessary to ensure not only the stability of the structure, but also the stability of the electrical connection. The stability of the electrical connection may be related to the reliability of the connection between the components of the acoustic device. In order to ensure the stability of the electrical connection of the acoustic device, the hanger assembly 20 may be provided with a corresponding wire clamping structure.

In some embodiments, as shown in FIGS. 16 and 17, the connecting component 23 may include an elastic support component 233 and a joint part 237 connected with an end of the elastic support component 233. The joint part 237 may be configured to connect the speaker component 10. Another end of the elastic support component 233 may be connected with the first shell 241. The material of the elastic support component 233 may be spring steel, titanium, metallic or non-metallic materials. In order to protect the elastic support component 233, the connecting component 23 may include an elastic coating 236 covering at least the outer circumference of the elastic support component 233 (as shown in FIG. 13). The material of the elastic coating 236 may be silica gel, rubber, plastic or other materials. The elastic support component 233 may be further wrapped in the first shell 241 and the second shell 242. As shown in FIGS. 16 and 17, the joint part 237 may have a first wire clamping part 2371, and the first shell 241 may have a second wire clamping part 2372. Wires led out through the speaker component 10 may enter the space 21 through the first wire clamping part 2371 and the second wire clamping part 2372 in turn. The first wire clamping part 2371 and the second wire clamping part 2372 may be configured to clamp the wire in a radial direction of the wire, to reduce the shaking of the wire in the radial direction and an extension direction.

In some embodiments, the first wire clamping part 2371 may have two first sub-wire clamping parts 23711 arranged with intervals in the radial direction of the wire. As shown in FIG. 17, the two first sub-wire clamping parts 23711 may be staggered from each other in the extension direction of the wire. The two first sub-wire clamping parts 23711 may clamp the wire in the radial direction of the wire when the wire passes between the two first sub-wire clamping parts 23711, to limit a movement of the wire in the radial direction. An extension length of the two first wire clamping parts 23711 in the extension direction of the wire may be different. The second wire clamping part 2372 may have two second sub-wire clamping parts 23721 arranged with intervals in the radial direction of the wire. The two second sub-wire clamping parts 23721 may be arranged opposite to each other. The two second sub-wire clamping parts 23721 may clamp the wire in the radial direction of the wire when the wire passes between the two second sub-wire clamping parts 23721, to limit the movement of the wire in the radial direction.

In some embodiments, in order to facilitate the connection of the joint part 237 to the speaker component 10, and enhance the connection stability between the joint part 237 and the speaker component 10, as shown in FIG. 17, an end 2373 of the joint part 237 may form two grooves 23731 crossed with each other to divide the end 2373 into four sub ends. Thus, the elasticity of the end 2373 may be increased, and the four sub ends may be squeezed and elastically restored. The grooves 23731 may be through grooves. When the joint part 237 is connected with the speaker component 10, the four sub ends may be pressed close to each other, making the end 2373 smaller, to plug the joint part 237 into the speaker component 10. The outer circumference of the sub ends may be provided with a protrusion 2374. When the joint part 237 is inserted into the speaker component 10, the protrusion 2374 may be clamped by the speaker component 10 to limit the movement of the joint part 237 away from the speaker component 10. Thus, connection reliability between the hanger assembly 20 and the speaker component 10 may be improved.

Figure 18:
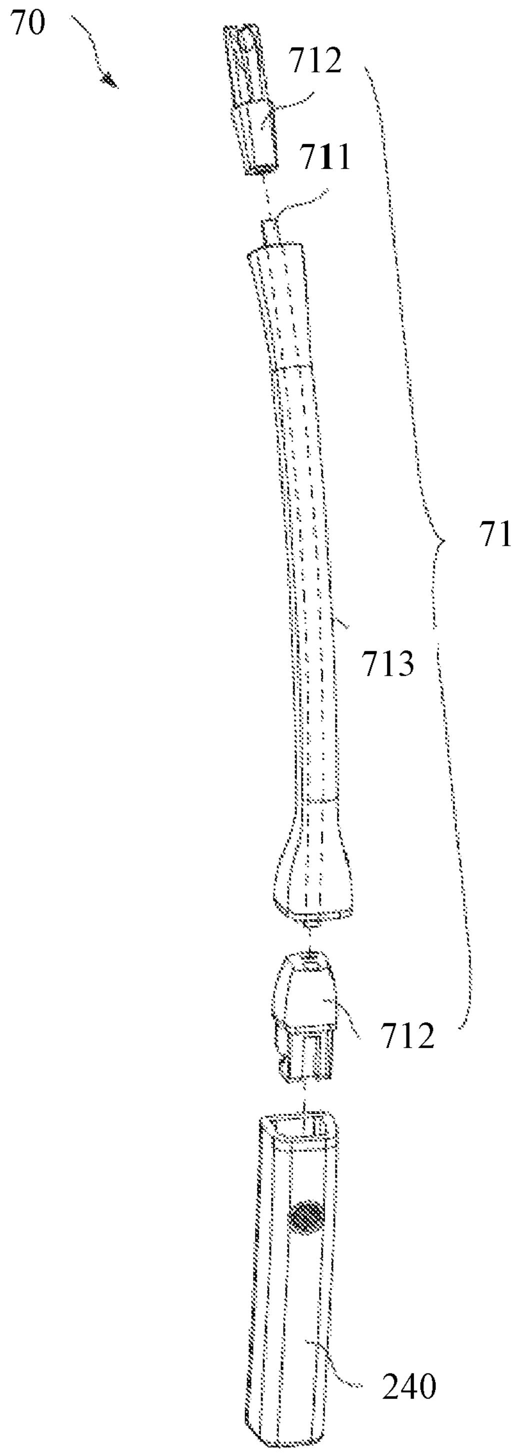
FIG. 18 is a schematic diagram illustrating disassembled structures of an exemplary audio input component according to some embodiments of the present disclosure.

FIG. 18 is a schematic diagram illustrating disassembled structures of an exemplary audio input component according to some embodiments of the present disclosure. In some embodiments, a count of audio input component 70 may be one, which may be connected with one of the two speaker components 10. For example, the audio input component 70 may be connected with the speaker component 10 corresponding to the battery assembly 50. In some embodiments, each speaker component 10 may be connected with an audio input component 70. As shown in FIG. 18, the audio input component 70 may include an elastic connecting rod 71 and a sound pickup component 240. An end of the elastic connecting rod 71 may be connected with the speaker component 10. Another end of the elastic connecting rod 71 may be connected with the sound pickup component 240. The sound pickup component 240 may have one or more microphones. For example, the sound pickup component 240 may have two or more microphones. The two or more microphones may be arranged with intervals. For example, a microphone may be located at an end of the sound pickup component 240 away from the speaker component 10, and other microphones may be located on a side of the sound pickup component 240 connected with the end, which may facilitate the cooperative work of microphones, and may play the role of noise reduction and improving the pickup quality. As described above, the acoustic device may convert audio into mechanical vibrations. That is, when the speaker component 10 plays the corresponding audio, the speaker component 10 may generate corresponding vibration. The mechanical vibration generated by the speaker component 10 may adversely affect the pickup effect of the audio input component 70, such as echo, or the like. For this purpose, the elastic connecting rod 71 may be provided to make that an average amplitude attenuation rate is not less than 35% when a vibration of a voice frequency band generated by the speaker component 10 is transmitted from the one end of the elastic connecting rod 71 to another end of the elastic connecting rod 71. In this way, in the process of vibration transmission, the elastic connecting rod 71 may effectively absorb the vibration, reduce the vibration amplitude transmitted from an end of the elastic connecting rod 71 to another end, and then reduce the vibration of the sound pickup component 240 caused by the vibration generated by the speaker assembly 10. Thus, the impact of the vibration of the speaker assembly 10 on the pickup effect of the sound pickup component 240 may be effectively reduced, and the sound pickup quality may be improved. In some embodiments, the above average amplitude attenuation rate may not be less than 45%. In some embodiments, the above average amplitude attenuation rate may not be less than 50%. In some embodiments, the above average amplitude attenuation rate may not be less than 55%. In some embodiments, the above average amplitude attenuation rate may not be less than 60%. In some embodiments, the above average amplitude attenuation rate may not be less than 70%.

As shown in FIG. 18, the elastic connecting rod 71 may include an elastic support component 711 and connecting parts 712 respectively connected with ends of the elastic support component 711. A connecting part 712 connected with an end of the elastic support component 711 may be used for plug-in cooperation with the sound pickup component 240. A connecting part 712 connected with another end of the elastic support 711 may be used for plug-in cooperation with the speaker component 10. The plug-in structures of the two connecting parts 712 may be the same or different, which may be adapted to the plug-in structures of the sound pickup component 240 and the speaker component 10 respectively. In some embodiments, elastic modulus of the elastic support 711 may be 70-90 GPa, thus the elastic support component 711 may have a good ability to absorb vibration to meet the requirements of the vibration absorption ability of the audio input component 70. Then the sound pickup quality of the sound pickup component 240 may be improved. In some embodiments, the elastic modulus of the elastic support component 711 may be 75-85 GPa. In some embodiments, the elastic modulus of the elastic support component 711 may be 80-84 GPa. In some embodiments, the elastic modulus of the elastic support component 711 may be 81-83 GPa. In some embodiments, the material of the elastic support component 711 may be spring steel, titanium, metallic or non-metallic materials.

As shown in FIG. 18, the elastic connecting rod 71 may include an elastic coating 713 wrapped around the outer circumference of the elastic support component 711. The elastic modulus of the elastic coating 713 may be 0.5-2 Gpa. Further, because the elastic coating 713 is wrapped outside the elastic support component 711, the vibration transmitted by the elastic support component 711 may be further absorbed, forming the effect of internal and external coordinated vibration absorption. Thus, the vibration absorption effect of the sound input component 70 may be greatly improved, the vibration transmitted to the sound pickup component 240 may be effectively reduced, and the sound pickup quality may be improved. In some embodiments, the elastic modulus of the elastic coating 713 may be 0.8-1.5 gpa. In some embodiments, the elastic modulus of the elastic coating 713 may be 1.2-1.4 Gpa. The elastic coating 713 may further cover a portion of the connecting part 712, to protect the elastic support component 711 and the connecting part 712. In some embodiments, the material of the elastic coating 713 may be silica gel, rubber, plastic, or the like. In some embodiments, the elastic coating 713 may be provided with a wire channel arranged in parallel and at intervals with the elastic support 711 along the length direction. The connecting part 712 may be provided with an embedded groove connecting the wire channel. Thus, the wire connecting the sound pickup component 240 may enter the wire channel through the embedded groove of the connecting part 712, and then enter the speaker component 10 through another connecting part 712.

Figure 19:
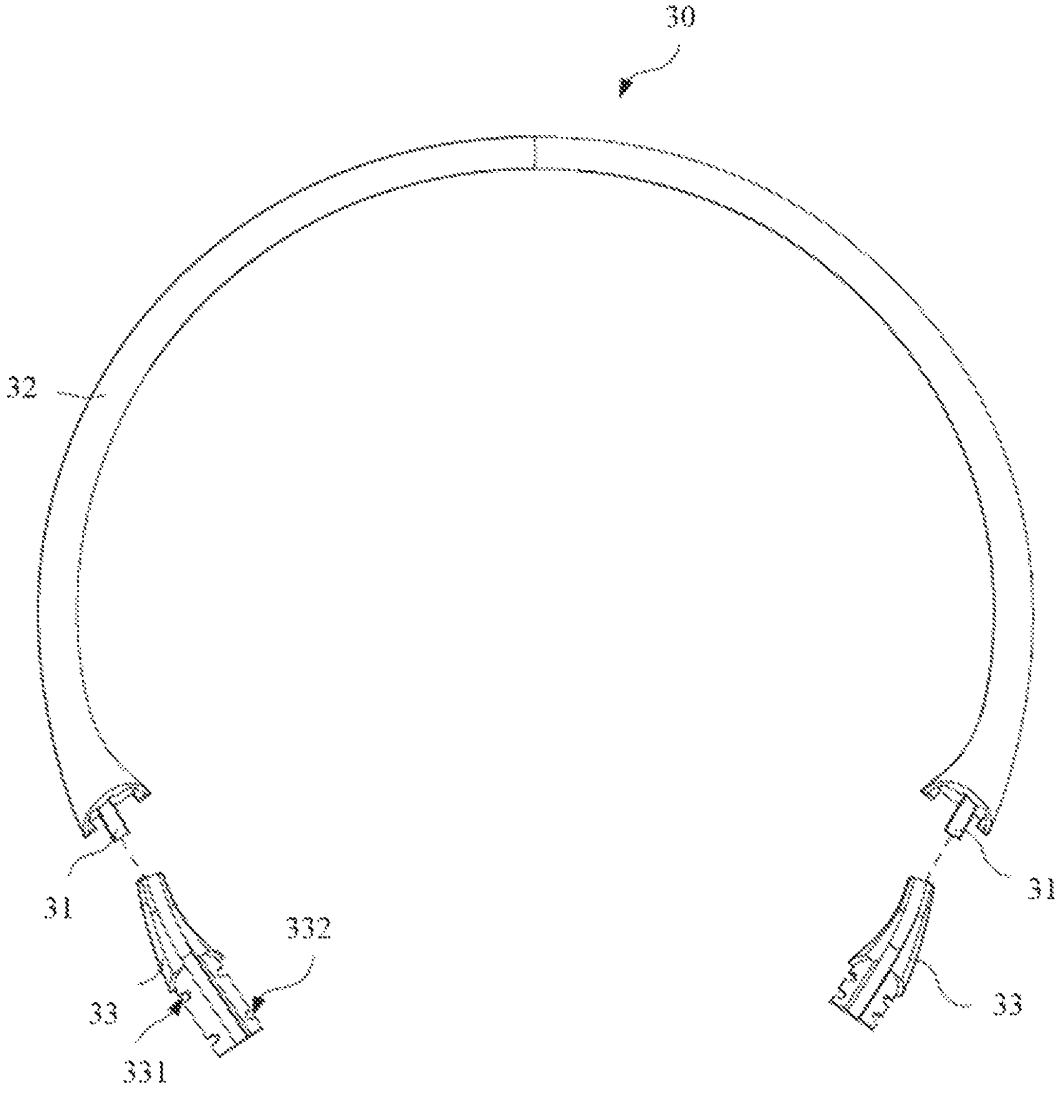
FIG. 19 is an exploded view illustrating structures of an exemplary rear hanger assembly according to some embodiments of the present disclosure.
Figure 20:
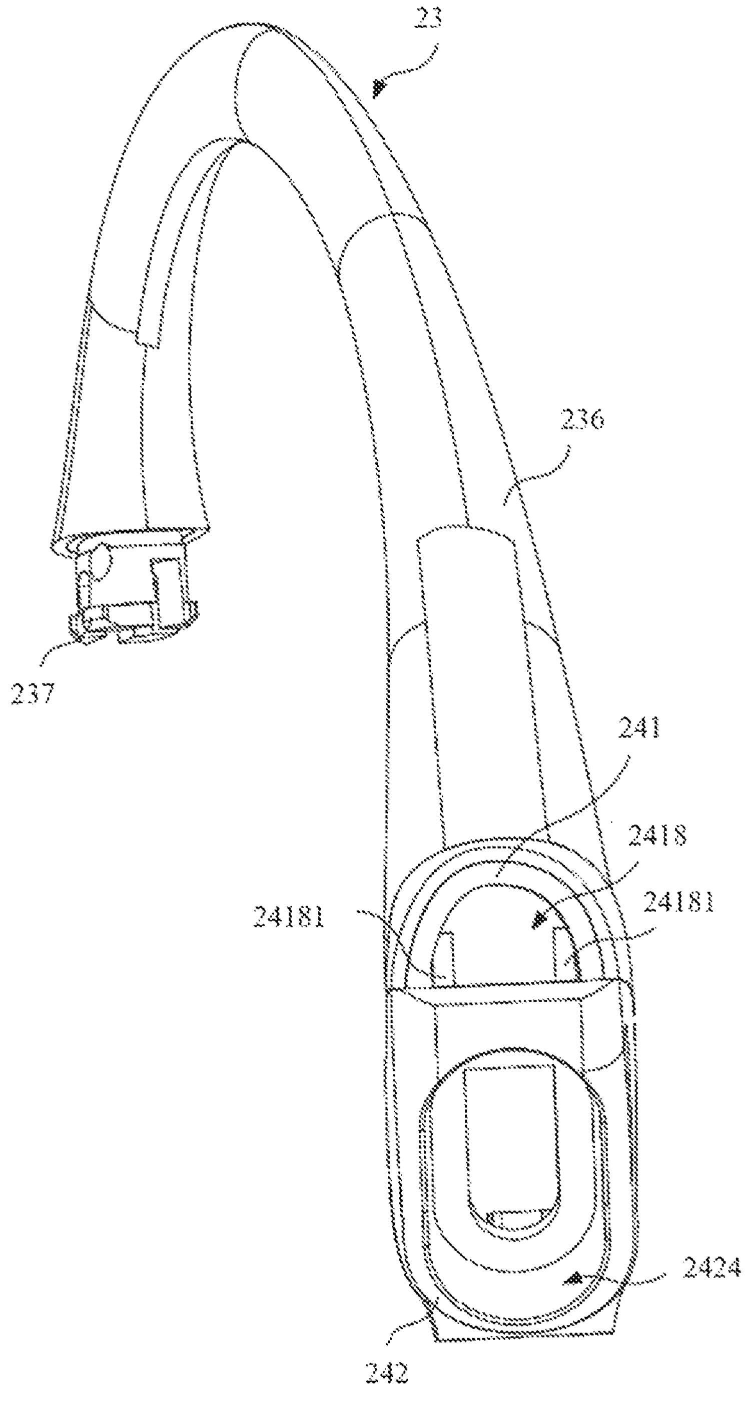
FIG. 20 is a structure diagram illustrating an exemplary hanger assembly according to some embodiments of the present disclosure.

FIG. 19 is an exploded view illustrating structures of an exemplary rear hanger assembly according to some embodiments of the present disclosure. FIG. 20 is a structure diagram illustrating an exemplary hanger assembly according to some embodiments of the present disclosure. As shown in FIG. 19, the rear hanger assembly 30 may include an elastic support component 31, an elastic coating 32 coated on the elastic support component 31, and a connecting part 33 arranged at ends of the elastic support component 31. The elastic coating 32 may also cover at least a portion of the connecting part 33. The connecting part 33 may be configured to connect with the hanger assembly 20. Specifically, as shown in FIG. 13, FIG. 15 and FIG. 20, an end of the first shell 241 away from the connecting part 23 may be provided with a connecting socket 2418 connecting the space 21. The connecting socket 2418 and the second clamping groove 2412 may be arranged adjacent to each other. The connecting part 33 may be inserted into the connecting socket 2418. A first slotting group 331 and a second slotting group 332 may be arranged with an interval on a direction of extension of at least one connecting part 33. The first slotting group 331 or the second slotting group 332 may include at least one slot 331. The elastic support component 31 may be inserted into the connecting part 33 through an end of the connecting part 33. The first slotting group 331 may be connected with the end of the elastic support component 31 away from the connecting part 33, and the second slotting group 332 may be close to the end of the connecting part 33. The first slotting group 331 may be used for mold positioning. As shown in FIGS. 15 and 20, the first shell 241 may be provided with a clamping part 24181. For example, a clamping part 24181 may be protruded in the connecting socket 2418 of the first shell 241. The connecting part 33 may be inserted into the connecting socket 2418, and the clamping part 24181 may be embedded in the first slotting group 331, thereby the relative movement of the hanger assembly 20 and the rear hanger assembly 30 may be limited. The second slotting group 332 may be used for clamping with the first shell 241. The second slotting group 332 may cooperate with the corresponding protruding structure, to accurately fix the connecting part 33 on a certain position, then other processes may be performed on the connecting part 33 to improve the yield rate. For example, after positioning the connecting part 33 and the elastic support component 31 based on the second slotting group 332, the elastic coating 32 may be formed by injection molding.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Meanwhile, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as an "data block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the operator's computer, partly on the operator's computer, as a stand-alone software package, partly on the operator's computer and partly on a remote computer or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. In fact, features of embodiments may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Contents of each of patents, patent applications, publications of patent applications, and other materials, such as articles, books, specifications, publications, documents, etc., referenced herein are hereby incorporated by reference, excepting any prosecution file history that is inconsistent with or in conflict with the present document, or any file (now or later associated with the present disclosure) that may have a limiting effect to the broadest scope of the claims. It should be noted that if the description, definition, and/or terms used in the appended materials of the present disclosure is inconsistent or conflicts with the content described in the present disclosure, the use of the description, definition and/or terms of the present disclosure shall prevail.

Finally, it should be understood that the embodiments described in the present disclosure merely illustrates the principles of the embodiments of the present disclosure. Other modifications may be within the scope of the present disclosure. Accordingly, by way of example, and not limitation, alternative configurations of embodiments of the present disclosure may be considered to be consistent with the teachings of the present disclosure. Accordingly, the embodiments of the present disclosure are not limited to the embodiments explicitly introduced and described by the present disclosure.

What is claimed is:

1. An acoustic device, comprising:
- a hanger assembly including a shell forming a space;
- at least one of an audio input component or an audio output component;
- a control circuit assembly including one or more circuit boards arranged in the space;
- a protection assembly including a protection plate, wherein
  - the protection plate is arranged in the space and physically connected with the shell of the hanger assembly to form a protection barrier between at least one of the one or more circuit boards and the shell.

2. The acoustic device of claim 1, wherein
- the control circuit assembly includes an interaction component configured to facilitate interaction between a user and the control circuit assembly,
- the interaction component includes a first component arranged on the shell and a second component arranged on at least one of the one or more circuit boards,
- the first component is configured to receive an instruction of the user, and
- the second component is configured to trigger the control circuit assembly to implement a function corresponding to the instruction in response to the instruction received by the first component.

3. The acoustic device of claim 2, wherein the first component includes one or more keys, the second component includes one or more switches, the shell is provided with a first hole, the protection plate is provided with a second hole, and the one or more keys are movably arranged in the first hole and the second hole to toggle the one or more switches and trigger the control circuit assembly to implement a corresponding function.

4. The acoustic device of claim 3, wherein at least one of the one or more keys includes a movable part and a connecting part, at least a portion of the movable part is located in the first hole, and the connecting part passes through the second hole to contact and toggle at least one of the one or more switches.

5. The acoustic device of claim 4, wherein a surface of the protection plate facing the movable part is provided with protrusions around an edge of the second hole, and the protrusions butt a surface of the movable part.

6. The acoustic device of claim 4, wherein the connecting part includes two connecting plates,
- an end of each of the two connecting plates is connected with the movable part, and
- another end of each of the two connecting plates is provided with a connector to connect the protection plate.

7. The acoustic device of claim 6, wherein the another end of one of the two connecting plates is provided with an accommodation area configured to accommodate the one or more switches to make the one or more keys toggle the one or more switches.

8. The acoustic device of claim 1, wherein
- the audio output component includes a speaker component configured to convert an audio signal into a mechanical vibration, and
- the hanger assembly includes a connecting component, one end of the connecting component is connected with the shell, and another end of the connecting component is connected with the speaker component.

9. The acoustic device of claim 8, wherein the shell includes a first shell and a second shell, the first shell is physically connected with the connecting component, and the first shell and the second shell are connected to form the space.

10. The acoustic device of claim 9, wherein the space has a length direction and a thickness direction perpendicular to the length direction, and the first shell is spliced to the second shell along a splicing direction perpendicular to the length direction and the thickness direction.

11. The acoustic device of claim 10, wherein
a first clamping groove and a second clamping groove are arranged on the first shell with an interval along the length direction,
a first clamping block and a second clamping block are arranged on the second shell along the thickness direction, and
the first clamping block is embedded in the first clamping groove, and the second clamping block is embedded in the second clamping groove to clamp the first shell and the second shell.

12. The acoustic device of claim 11, wherein
a portion of the second shell is provided with a power socket, the power socket is connected with the space, and the power socket is configured to accommodate a power interface, and
the second clamping block is closer to the space relative to the power socket.

13. The acoustic device of claim 12, wherein
a projection of the second clamping block and a projection of the power socket on a first reference plane perpendicular to the length direction overlap, and
the projection of the second clamping block and the projection of the power socket on a second reference plane perpendicular to the splicing direction overlap.

14. The acoustic device of claim 11, wherein
a direction of an opening of the first clamping groove and a direction of an opening of the second clamping groove are the same, and the first clamping groove and the second clamping groove are respectively located at ends of the first shell along the length direction, and
the opening of the first clamping groove faces the space, and the opening of the second clamping groove deviates from the space;
a direction of an extension of the first clamping block and a direction of an extension of the second clamping block are the same, and the first clamping block and the second clamping block are respectively located at ends of the second shell along the length direction, and
the extension of the first clamping block deviates from the space, and the extension of the second clamping block faces the space.

15. The acoustic device of claim 10, wherein
an edge part of the first shell forms a first limiting component,
the second shell is provided with a second limiting component, and
the first limiting component and the second limiting component are configured to limit a relative movement of the first shell and the second shell in the length direction.

16. The acoustic device of claim 8, wherein
the audio input component includes a sound pickup component configured to obtain external sounds, and the sound pickup component is arranged in the space, and
the shell is provided with a third hole, and the sound pickup component obtains the external sounds through the third hole.

17. The acoustic device of claim 16, wherein
the audio input component further includes an elastic connecting rod, and
an end of the elastic connecting rod is connected with the speaker component, another end of the elastic connecting rod is connected with the sound pickup component.

18. The acoustic device of claim 17, wherein the elastic connecting rod is provided to make that an average amplitude attenuation rate is not less than 35% when a vibration of a voice frequency band generated by the speaker component is transmitted from the one end of the elastic connecting rod to the another end of the elastic connecting rod.

19. A bone conduction earphone, comprising:
an audio output component configured to convert an audio signal into a mechanical vibration, and
a hanger assembly including a first shell, a connecting component, and a second shell, wherein:
an end of the connecting component is connected with the first shell, another end of the connecting component is connected with the audio output component,
the first shell and the second shell are connected to form a space,
the space has a length direction and a thickness direction perpendicular to the length direction,
a first clamping groove and a second clamping groove are arranged on the first shell with an interval along the length direction,
a first clamping block and a second clamping block are arranged on the second shell along the thickness direction, and
the first clamping block is embedded in the first clamping groove, and the second clamping block is embedded in the second clamping groove to clamp the first shell and the second shell.

20. A waterproof key component, comprising:
a shell including a space and a first hole connecting with the space;
one or more keys; and
a protection plate arranged in the space and physically connected with the shell to form a protection barrier between at least one circuit board in the space and the shell, wherein the protection plate is provided with a second hole, and the one or more keys are movably arranged in the first hole and the second hole for performing a switch operation.

* * * * *